US008534221B2

(12) United States Patent
Tsuji et al.

(10) Patent No.: US 8,534,221 B2
(45) Date of Patent: *Sep. 17, 2013

(54) HONEYCOMB FILTER PRODUCTION APPARATUS

(75) Inventors: Hiroyuki Tsuji, Nagoya (JP); Takayoshi Akao, Nagoya (JP); Shuhei Fujita, Nagoya (JP); Kazuhi Matsumoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 27 days.

This patent is subject to a terminal disclaimer.

(21) Appl. No.: 13/049,146

(22) Filed: Mar. 16, 2011

(65) Prior Publication Data

US 2011/0229634 A1     Sep. 22, 2011

(30) Foreign Application Priority Data

Mar. 18, 2010  (JP) ................... 2010-062248
Jan. 11, 2011   (JP) ................... 2011-002644
Mar. 11, 2011   (JP) ................... 2011-053964

(51) Int. Cl.
  *B05C 19/00*   (2006.01)
  *B05C 11/00*   (2006.01)
  *B05C 13/02*   (2006.01)
  *B05B 13/06*   (2006.01)

(52) U.S. Cl.
  USPC ............. 118/306; 118/308; 118/317; 118/62; 118/63; 118/602

(58) Field of Classification Search
  USPC .................. 118/308, 309, 306, 316, DIG. 10, 118/61–64, 70, 602; 427/180, 230, 236
  See application file for complete search history.

(56) References Cited

U.S. PATENT DOCUMENTS

| 4,420,508 | A |   | 12/1983 | Gibson |
|---|---|---|---|---|
| 4,698,241 | A |   | 10/1987 | Roberson |
| 5,454,872 | A | * | 10/1995 | Lader et al. ................. 118/602 |
| 5,722,802 | A |   | 3/1998 | March |
| 2007/0227447 | A1 |   | 10/2007 | Kukkurainen et al. |
| 2008/0171135 | A1 | * | 7/2008 | Burch ............................. 427/58 |

FOREIGN PATENT DOCUMENTS

| DE | 42 25 970 C1 |   | 4/1994 |
|---|---|---|---|
| EP | 0 943 372 A2 |   | 9/1999 |
| EP | 1 775 021 A1 |   | 4/2007 |
| JP | 10-249124 A1 |   | 9/1998 |
| JP | 10-263340 A1 |   | 10/1998 |
| JP | 2006-000685 A1 |   | 1/2006 |
| KR | 2002068201 A | * | 8/2002 |

OTHER PUBLICATIONS

U.S. Appl. No. 13/049,205, filed Mar. 16, 2011, Hiroyuki Tsuji.

* cited by examiner

*Primary Examiner* — Yewebdar Tadesse
(74) *Attorney, Agent, or Firm* — Burr & Brown

(57) ABSTRACT

A honeycomb filter production apparatus used for producing a honeycomb filter, the apparatus includes: a workpiece securing section for securing a base (workpiece) of a honeycomb filter; a powder transfer section for transferring a powder together with an air current by utilizing pressurized gas; an introduction section that is provided between the powder transfer section and the workpiece securing section, the powder transferred from the powder transfer section together with the air current being mixed with another gas in the introduction section, and introduced into the base (workpiece) secured by the workpiece securing section; and a suction section for sucking the gas that has passed through the base (workpiece) secured by the workpiece securing section by reducing pressure on the other side of the workpiece securing section as compared with the one side of the workpiece securing section using suction means.

11 Claims, 20 Drawing Sheets

HONEYCOMB FILTER PRODUCTION APPARATUS

BACKGROUND OF THE INVENTION

The present invention relates to an apparatus that produces a honeycomb filter that includes a base formed of a porous body, and a collection layer that is formed on the surface of the base and collects particles.

Exhaust gas discharged from an internal combustion engine (e.g., diesel engine) or a combustion apparatus contains a large amount of particulate matter (PM) that mainly contains soot (graphite). If PM is directly discharged to the atmosphere, environmental pollution occurs. Therefore, a filter apparatus including a diesel particulate filter (DPF) that collects PM is normally provided in an exhaust gas passage.

For example, a honeycomb filter having a honeycomb structure has been known as the DPF (element) included in such a filter apparatus. The honeycomb filter includes a plurality of cells (gas passages) defined by a partition wall formed of a porous ceramic having a number of pores (i.e., has a honeycomb structure), one open end and the other open end of adjacent cells being alternately plugged. When exhaust gas is introduced into one open end of the cells of the canned honeycomb filter, the exhaust gas passes through the partition wall, and is discharged from the other open end of the adjacent cells. PM is collected and removed by the partition wall when the exhaust gas passes through the honeycomb filter, so that the exhaust gas is purified.

However, such a honeycomb filter tends to show a rapid increase in pressure loss due to coat of PM. JP-A-10-249124, JP-A-2006-685, and JP-A-10-263340 disclose honeycomb filters having a novel structure aimed at reducing a pressure loss. These honeycomb filters are characterized in that a honeycomb structure (i.e., porous body) is used as a base (support), and a collection layer that collects PM is formed on the surface of the base. JP-A-10-249124, JP-A-2006-685, and JP-A-10-263340 also disclose a method of producing such a honeycomb filter.

SUMMARY OF THE INVENTION

The invention was conceived in view of the above situation. An object of the invention is to provide a means that enables a high-quality honeycomb filter having a configuration in which a collection layer having a uniform thickness is formed on the surface of a base formed of a porous body, to be produced with high productivity and high yield. As a result of extensive studies, it was found that the above object can be achieved by the following means. This finding has led to the completion of the invention.

According to one aspect of the invention, there is provided a honeycomb filter production apparatus used for producing a honeycomb filter, the apparatus including:

a workpiece securing section for securing a base of a honeycomb filter;

a powder transfer section that is disposed on one side of the workpiece securing section, and transfers a powder together with an air current by utilizing pressurized gas;

an introduction section that is provided between the powder transfer section and the workpiece securing section, the powder transferred from the powder transfer section together with the air current being mixed with another gas in the introduction section, and introduced into the base secured by the workpiece securing section when the apparatus is used;

a suction section that is disposed on the other side of the workpiece securing section, and sucks the gas that has passed through the base secured by the workpiece securing section by reducing pressure on the other side of the workpiece securing section as compared with the one side of the workpiece securing section using suction means.

A honeycomb filter produced by the above honeycomb filter production apparatus includes a base having a pillar-like (preferably columnar or quadrangular prism) external shape formed by an outer circumferential surface and two end faces, the base including a plurality of cells (fluid passages) that extend from one end face to the other end face, and are defined by a partition wall formed of a porous ceramic, one open end and the other open end of adjacent cells being alternately plugged, and a collection layer being formed on the inner surface of the base.

The term "workpiece" used herein refers to the base (porous body) of the honeycomb filter. The workpiece (i.e., the base of the honeycomb filter) is secured by the workpiece securing section when using the honeycomb filter production apparatus. The inner surface of the base (workpiece) of the honeycomb filter on which the collection layer is formed refers to the surface of the base that defines the cells, and may be referred to as the inner surface of the cells. The area of the base that defines the cells is referred to as "partition wall" or "cell wall". The inner surface of the base, the inner surface of the cells, the surface of the partition wall and the cell wall have an identical meaning. The one side of the workpiece securing section on which the powder transfer section is disposed may be referred to as "inlet side", and the other side of the workpiece securing section on which the suction section is disposed may be referred to as "outlet side".

In the introduction section, the powder transferred from the powder transfer section together with an air current is mixed with another gas (air current), and introduced into the base secured by the workpiece securing section. The introduction section is a space that is not closed. Specifically, the honeycomb filter production apparatus according to one aspect of the invention includes the workpiece securing section, and the powder transfer section disposed on one side of the workpiece securing section, and has an opened space (i.e., introduction section) between the powder transfer section and the workpiece securing section. The dimensions of the introduction section (i.e., the distance between the workpiece securing section and the powder transfer section (the distance between the base secured by the workpiece securing section and the powder transfer section)) are preferably equal to or larger than the diameter of a minimum circle that includes the end face of the base on the side of the powder transfer section, and more preferably equal to or larger than a value three times the diameter of the minimum circle. Incidentally, the "minimum circle that includes the end face of the base on the side of the powder transfer section" means a circle corresponding to the shape and the size of the end face (circle having the same diameter as that of the end face) in the case that the shape of the end face of the base on the side of the powder transfer section is circular, and, in the case of the shape of the end face of the base on the side of the powder transfer section is not circular, (for example, polygonal) it means a circumcircle 80 of the end face 11a of the substrate on the side of the powder transfer section as shown in FIG. 12. And, the diameter of the minimum circle is the diameter r of the circumcircle 80. The honeycomb filter production apparatus according to one aspect of the invention may include one introduction section, and two or more powder transfer sections.

The gas that includes the powder dispersed therein, and the pressurized gas used to disperse the powder are normally air. The pressure of the pressurized gas is not particularly limited, but is preferably about 1.5 to 5 atmospheres.

The honeycomb filter production apparatus according to one aspect of the invention produces a honeycomb filter in which a collection layer is formed on the inner surface of the base. The honeycomb filter production apparatus according to one aspect of the invention is a dry coat apparatus that can form the collection layer on the target object (base) using the powder dispersed in gas (hereinafter may be referred to as "aerosol"). In the honeycomb filter production apparatus according to one aspect of the invention, the powder is ejected from the powder transfer section together with an air current, and mixed with another gas in the introduction section. The resulting mixed gas is introduced into the cells of the base, and sucked from the other side of the base. In this case, the gas passes through the partition wall of the base, but the powder does not pass through the partition wall of the base, and is coated on the inner surface of the cells (i.e., the inner surface of the base). The base and the powder are bonded (integrated) by the subsequent heat treatment to form a collection layer.

In the honeycomb filter production apparatus according to one aspect of the invention, the powder transfer section preferably includes powder-dispersing means that utilizes pressurized gas. Examples of the powder-dispersing means include an ejector and an aerosol-producing chamber. It is preferable that the powder-dispersing means be an ejector. It is preferable that the ejector sucks the powder by utilizing an air current, and discharges the powder together with pressurized gas so that the powder is dispersed in the gas. In this case, the ejector disperses the powder in the gas, and ejects the powder together with an air current (gas). Specifically, the ejector sucks the powder by utilizing a negative pressure produced by a high-speed air current, and discharges the powder to the gas together with the pressurized gas. The powder transfer section may include only one ejector, or may include two or more ejectors. It is preferable that the powder suction direction and the powder discharge direction of the ejector be approximately parallel.

In the honeycomb filter production apparatus according to one aspect of the invention, the powder transfer section preferably includes powder-feeding means that supplies a given amount of powder. When the honeycomb filter production apparatus includes the ejector, a plurality of powder-feeding means may be provided on the powder suction side of the ejector.

In the honeycomb filter production apparatus according to one aspect of the invention, the introduction section preferably includes a guide member that guides the powder to the base secured by the workpiece securing section. When the base has a pillar-like shape, the guide member may have a shape corresponding to the external shape of the base (workpiece) (particularly the shape of the end face of the base). The guide member preferably has a tubular shape having a cross section similar to the external shape of the base (particularly the shape of the end face of the base). The guide member may have a columnar (cylindrical) shape or a square pipe shape. When the base has a columnar shape, the guide member preferably has a columnar (cylindrical) shape having a diameter almost equal to or larger than the diameter of a minimum circle that includes the end face of the base. The guide member preferably has a length equal to or larger than the diameter of a minimum circle that includes the end face of the base on the side of the powder transfer section, and more preferably equal to or larger than a value three times the diameter of the minimum circle. The end of the guide member opposite to the workpiece securing section is open. The end of the guide member on the side of the workpiece securing section is preferably positioned close to the end face or the outer circumferential surface of the base secured by the workpiece securing section. It is more preferable that the end of the guide member on the side of the workpiece securing section be in contact with the end face or the outer circumferential surface of the base, and sealed.

When the honeycomb filter production apparatus according to one aspect of the invention includes the guide member, it is preferable that the guide member be a tubular porous body in order to prevent a situation in which the powder adheres to the inner circumferential surface of the guide member. It is preferable that the guide member include an outer tube section, and an inner tube section that has a number of holes and is disposed inside the outer tube section at a given interval from the outer tube section, and the introduction section include gas supply means that supplies gas to a space between the outer tube section and the inner tube section. It is preferable that the guide member be tubular, and the introduction section include a discharge nozzle that discharges gas to an area around an inner circumferential surface of the guide member.

In a honeycomb filter production apparatus of the present invention, it is preferable that the introduction section is provided with a speed adjusting means for adjusting the speed by swirling the powder transferred by the air current from the powder transfer section. The speed is the speed of the air current transferring the powder and is equal to the speed of the powder. An example of the speed adjusting means is a circular cylindrical member having two openings having different sizes. Such a circular cylindrical member is a circular cylindrical member where one opening is narrowed to have a tapered shape for example. When the air current enters such a circular cylindrical member from the direction almost perpendicular to the axial direction of the circular cylindrical member, the air current is swirled, and the speed is adjusted (speed is reduced).

In the honeycomb filter production apparatus according to one aspect of the invention, it is preferable that the base of the honeycomb filter have a pillar-like shape, an axial direction of the base secured by the workpiece securing section be approximately vertical during use, and the air current flow upward. Specifically, the honeycomb filter production apparatus according to one aspect of the invention is preferably used so that the base is disposed vertically, and an air current passes through the base upward. The axial direction of the base is approximately vertical when the axial direction of the base is within 30° with respect to the gravity direction. It is more preferable that the axial direction of the base be within 15° with respect to the gravity direction. Specifically, it is preferable that the honeycomb filter production apparatus according to one aspect of the invention be configured so that the base can be disposed vertically.

In the honeycomb filter production apparatus according to one aspect of the invention, the powder transfer section or the introduction section preferably includes (powder) classification means. Centrifugal classification, gravity classification, or the like is preferably used as the classification means. In this case, the diameter of the powder transfer section or the introduction section may be increased, or a curved area may be formed in the powder transfer section or the introduction section, or an area where an air current flows downward may be formed in the powder transfer section or the introduction section.

In the honeycomb filter production apparatus according to one aspect of the invention, the workpiece securing section preferably includes a cover that covers the side surface of the base. The cover may have a shape similar to the external shape of the base. In the honeycomb filter production apparatus according to one aspect of the invention, the suction section preferably includes a flowmeter. Since the suction target is the gas from which the powder has been removed (due to adhesion to the inner surface of the cells), an anemometer may be used instead of a flowmeter. In the honeycomb filter production apparatus according to one aspect of the invention, the suction section preferably includes a current plate.

In the honeycomb filter production apparatus according to one aspect of the invention, the diameter r of a minimum circle that includes the end face of the base secured by the workpiece securing section on the side of the powder transfer section, and the distance d between the end face of the base on the side of the powder transfer section and the ejection end of the powder transfer section (ejection end of the ejector) preferably satisfy the relationship "r<d". In the honeycomb filter production apparatus according to one aspect of the invention, the distance d between the end face of the base secured by the workpiece securing section on the side of the powder transfer section and the ejection end of the powder transfer section, and the length L of the guide member preferably satisfy the relationship "0.5d<L".

According to another aspect of the invention, there is provided a method of producing a honeycomb filter including coating the powder on an inner surface of the base of the honeycomb filter using the above honeycomb filter production apparatus while adjusting a flow rate A of a gas a that is sucked by the suction section, a flow rate B of a gas b ejected from the powder transfer section, and a flow rate C of a gas c that is mixed with the gas b in the introduction section so that the relationships "A=B+C" and "C>0" are satisfied.

For example, the flow rate B of the gas ejected from the powder transfer section may be set to a constant value, and the flow rate A of the gas sucked by the suction section may be set to be higher than the flow rate B by the flow rate C.

The honeycomb filter production apparatus according to one aspect of the invention includes the powder transfer section that is disposed on one side of the workpiece securing section, and transfers the powder together with an air current by utilizing pressurized gas, and the suction section that is disposed on the other side of the workpiece securing section, reduces the pressure on the other side of the workpiece securing section as compared with the one side of the workpiece securing section using the suction means, and sucks the gas that has passed through the base. Therefore, the air current is aligned in one direction. The powder is uniformly and stably supplied to the cells of the base together with the air current aligned in one direction. Therefore, the honeycomb filter production apparatus according to one aspect of the invention can reliably coat the powder on the inner surface of the cells to a uniform thickness, so that the collection layer can be reliably formed on the inner surface of the cells to a uniform thickness. Moreover, since the powder rarely scatters as a result of aligning the air current in one direction, an excellent work environment is achieved.

In the honeycomb filter production apparatus according to one aspect of the invention, the powder is ejected from the powder transfer section together with an air current, and mixed with another gas in the introduction section, and the resulting mixed gas (air current) is introduced into the cells of the base. Since the powder is diffused during mixing, the powder is introduced into the entire end face (cells) of the base. This improves coat distribution uniformity. Moreover, the flow rate of the air current that passes through the base and the flow rate of the air current that flows through the powder transfer section can be independently controlled. It has been found that the microstructure and the coat distribution of the collection layer change depending on the concentration of the powder contained in the mixed gas introduced in the cells, and the flow rate of the gas. The concentration of the powder contained in the mixed gas introduced in the cells, and the flow rate of the gas may be controlled by adjusting the suction flow rate of the suction section, and the concentration of the powder contained in the mixed gas supplied from the powder transfer section. On the other hand, the powder transfer section requires a given flow rate in order to disperse the powder in the gas. Therefore, it is effective if the flow rate of the air current that passes through the base and the flow rate of the air current that flows through the powder transfer section can be independently controlled.

Since the honeycomb filter production apparatus according to one aspect of the invention utilizes the pressurized gas when dispersing the powder in the gas, a flow rate gradient can be formed by increasing the flow rate. Therefore, a sufficient impact force and shear force can be applied to the powder. As a result, the powder is uniformly dispersed in the gas. A fine powder having a particle size of about 20 μm or less may aggregate and form large particles in a stationary state. In this case, the powder may not be uniformly dispersed in the gas. However, since the honeycomb filter production apparatus according to one aspect of the invention cracks the powder by utilizing the pressurized gas, the above problem does not occur.

In the honeycomb filter production apparatus (dry coat apparatus) according to one aspect of the invention, since the powder is supplied to the inner surface of the cells (i.e., the surface of the partition wall) in a dry state, it is unnecessary to perform a drying step and a cleaning step that are required when using additives such as water and a binder, and an excellent collection layer without defects can be formed on the base (partition wall).

The honeycomb filter production apparatus according to one aspect of the invention is preferably configured so that the powder transfer section includes the powder-dispersing means (ejector) that utilizes pressurized gas. In this case, a large amount of powder can be dispersed in the gas, and ejected per unit time. For example, 50 g/min of powder can be dispersed in 0.1 m³/min of gas. Moreover, a given amount of powder can be transferred while cracking large particles, and introduced into the cells. Therefore, the honeycomb filter production apparatus according to one aspect of the invention can reliably and quickly coat the powder on the inner surface of the cells to a uniform thickness, so that the collection layer can be reliably and quickly formed on the inner surface of the cells to a uniform thickness. Since the flow rate of the gas that passes through the base can be easily controlled even when the powder transfer section includes a plurality of ejectors, the collection layer can be reliably formed on the inner surface of the cells to a uniform thickness. Moreover, the powder can be supplied to the ejector by utilizing an air current by sucking an air current produced by a negative pressure generated by the ejector. This ensures that the powder does not come in contact with the pipe when the pressurized gas is not supplied to the ejector (i.e., when a negative pressure is not generated (when an air current is not produced)). This prevents a situation in which the powder is coated on the pipe to produce large particles, or an insufficient powder supply due to a bridge occurs.

The honeycomb filter production apparatus according to one aspect of the invention is preferably configured so that the diameter r of a minimum circle that includes the end face of the base secured by the workpiece securing section on the side of the powder transfer section, and the distance d between the end face of the base on the side of the powder transfer section and the ejection end of the powder transfer section satisfy the relationship "r<d". In this case, the powder is uniformly coated on the inner surface of the cells in the diametrical direction of the base. The ejected powder is efficiently and uniformly introduced into all of the cells of the base. Moreover, the size of the apparatus can be reduced. If the end face of the base is positioned close to the ejection end of the powder transfer section (ejection end of the ejector) (i.e., the distance d is short), the powder ejected from the ejector is introduced into only part of the cells of the base. If the end face of the base is positioned away from the ejection end of the powder transfer section (ejection end of the ejector) (i.e., the distance d is long), the powder does not reach the cells of the base, and adheres to another member, or falls downward. This is disadvantageous. The diameter r of a minimum circle that includes the end face of the base secured by the workpiece securing section on the side of the powder transfer section, and the distance d between the end face of the base on the side of the powder transfer section and the ejection end of the powder transfer section (ejection end of the ejector) more preferably satisfy the relationship "3r<d".

The honeycomb filter production apparatus according to one aspect of the invention is preferably configured so that the introduction section includes a guide member that guides the aerosol to the base. In this case, diffusion of the aerosol is suppressed, and the air current is aligned in one direction, so that the yield is improved. Moreover, disturbance (e.g., air current inflow from the surroundings), the outer circumferential shape of the base, and the like rarely affect the production of the honeycomb filter. The powder is uniformly coated to the inner surface of the cells including the outermost cells in the diametrical direction of the base.

The honeycomb filter production apparatus according to one aspect of the invention is preferably configured so that the end of the guide member opposite to the workpiece securing section is open. In this case, the open end of the guide member functions as an opening for sucking the gas that passes through the base (excluding the aerosol ejected from the ejector). The open end of the guide member functions as an opening for discharging the powder that does not adhere to the base.

The honeycomb filter production apparatus according to one aspect of the invention is preferably configured so that the distance d between the end face of the base secured by the workpiece securing section on the side of the powder transfer section and the ejection end of the powder transfer section, and the length L of the guide member preferably satisfy the relationship "$0.5d<L$". In this case, the above effects can be sufficiently achieved. Specifically, diffusion of the aerosol is sufficiently suppressed, and the air current is sufficiently aligned in one direction. Moreover, the size of the apparatus can be reduced. If the end face of the base on the side of the powder transfer section is positioned close to the ejection end of the powder transfer section (ejection end of the ejector) (i.e., the distance d is short), the above effects cannot be sufficiently achieved. If the end face of the base on the side of the powder transfer section is positioned away from the ejection end of the powder transfer section (ejection end of the ejector) (i.e., the distance d is long), the size of the apparatus increases.

The honeycomb filter production apparatus according to one aspect of the invention is preferably configured so that the powder transfer section includes powder-feeding means that supplies a given amount of powder. The concentration of the powder in the aerosol can be easily controlled by sucking a given amount (mass) of powder from the ejector. Therefore, the concentration of the powder in the aerosol can be made constant. When introducing the aerosol having a constant concentration into the cells, the powder can be reliably coated on the inner surface of the cells to a uniform thickness, so that the collection layer can be reliably and quickly formed on the inner surface of the cells to a uniform thickness.

The honeycomb filter production apparatus according to one aspect of the invention is preferably configured so that the workpiece securing section includes a cover that covers the side surface of the base. In this case, the powder is uniformly coated on the inner surface of the cells including the outermost cells in the diametrical direction of the base, even if the base is a honeycomb structure having pores in its side surface (outer circumferential surface). If the base has pores in its side surface, the gas enters the outermost cells through the pores. As a result, the amount of aerosol that enters the cells through the openings of the end face may be reduced, so that the amount of powder that adheres to the inner surface of the cells may decrease. This problem can be solved by providing a cover that covers the side surface of the base. A desired air current can be achieved by preventing inflow of gas through the side surface of the base.

The honeycomb filter production apparatus according to one aspect of the invention is preferably configured so that the suction section includes a flowmeter. In this case, the flow rate of the gas that passes through the base can be controlled. As a result, the powder can be reliably coated on the inner surface of the cells to a uniform thickness, so that the collection layer can be reliably and quickly formed on the inner surface of the cells to a uniform thickness.

The honeycomb filter production apparatus according to one aspect of the invention is preferably configured so that the suction section includes a current plate. In this case, the flow rate of the gas that passes through the base can be made more uniform as compared with the case where the suction section does not include a current plate, even if the base has a large number of cells.

The honeycomb filter production apparatus according to one aspect of the invention is preferably configured so that the powder suction direction and the powder discharge direction of the ejector are approximately parallel. In this case, a change in direction of the air current of the ejector occurs to only a small extent, so that a large amount of powder can be supplied. Moreover, wear of the ejector occurs to only a small extent. It is also possible to suppress occurrence of a bridge (arch) and a rat hole in the pipe and the ejector, and prevent a situation in which powder is not supplied to the ejector.

In a honeycomb filter production apparatus of the present invention, since the introduction section is provided with a speed adjusting means for adjusting the speed by swirling the powder transferred by the air current from the powder transfer section in a preferable mode, the speed of the air current for transferring the powder can be adjusted (reduced) arbitrarily with maintaining the pulverization effect of the powder. By adjusting the speed of the air current for transferring the powder, the powder is classified to inhibit large (coarse) particles from entering the workpiece. In addition, by reducing the speed of the air current for transferring the powder, the speed of the air current passing through the base (workpiece) slows down, and the powder can adhere to the vicinity of the surface of the base. That is, the powder can adhere to the surface of the base in a bridge fashion without the powder entering the inside of pores of the base for a collection layer. In addition, in the case of the coat on a base (workpiece) having different porosity or different average pore size, the result can be obtained optimally by the adjustment of the speed of the air current.

The honeycomb filter production apparatus according to one aspect of the invention, it is preferable that the base of the honeycomb filter secured on the workpiece securing section has a pillar-like shape, an axial direction of the base secured by the workpiece securing section is approximately vertical during use, and the air current flows upward (i.e., the base is disposed vertically, and the air current pass through the base upward). In this case, the introduction section is provided with a gravity classifier capability with distribution uniformity, so that coat distribution uniformity is improved. If the base is disposed horizontally (i.e., the axial direction of the base secured by the workpiece securing section is approximately horizontal during use), the powder is affected by gravity, and the amount of powder that adheres to the surface of the partition wall that is positioned on the lower side becomes larger than the amount of powder that adheres to the surface of the partition wall that is positioned on the upper side. This particularly occurs when the flow rate of the air current is low. A situation in which large particles that impair coat enter the cells can be suppressed by vertically disposing the base during use. If large particles have entered the cells, large particles that are not carried by the air current can then fall downward (i.e., may not adhere to the surface of the partition wall) due to gravity, so that occurrence of a defective product may be prevented. If the base is disposed horizontally, it is necessary to increase the dimensions of the introduction section (i.e., the distance between the workpiece securing section and the powder transfer section) in order to suppress entrance of large particles into the cells. Moreover, coat necessarily becomes insufficient if large particles have entered the cells. Particles that have an appropriate size and do not adhere to the inner surface of the cells return to the introduction section, are mixed with the gas, and are introduced into the cells. This improves the yield. When vertically disposing the base, particles that do not adhere to the inner surface of the cells can be easily collected. For example, particles can be easily collected by providing a reception section right under the product. When providing the guide member, the powder can be easily collected by allowing particles that do not adhere to the inner surface of the cells to be discharged through the opening of the guide member. If the base is disposed horizontally, the powder is coated on the guide member, and it takes time to collect the powder. Moreover, the powder may be scattered due to the air current, and enter the product (i.e., a defective product may be obtained).

Since a control range that ensures sufficient quality can be increased by vertically disposing the base, the apparatus does not become complex, and a high-quality collection layer can be stably formed (coated). A significant effect is achieved when supplying a plurality of types of powder.

When vertically disposing a base having a pillar-like shape, it is preferable that the axial direction of the base be almost identical with the direction of the air current formed by the introduction section. The powder may be biased in one direction if the axial direction of the base differs from the direction of the air current formed by the introduction section.

The honeycomb filter production apparatus according to one aspect of the invention is preferably configured so that the powder transfer section or the introduction section includes classification means. In this case, large particles can be excluded, so that occurrence of insufficient coat can be suppressed. The term "large particle" used herein refers to a particle that is not cracked and has a large particle size, a particle that has adhered to a pipe and aggregated, and the like.

The method of producing a honeycomb filter according to one aspect of the invention includes coating the powder on an inner surface of the base of the honeycomb filter using the above honeycomb filter production apparatus while adjusting a flow rate A of a gas a that is sucked by the suction section, a flow rate B of a gas b ejected from the powder transfer section, and a flow rate C of a gas c that is mixed with the gas b in the introduction section so that the relationships "A=B+C" and "C>0" are satisfied. Therefore, the powder mixed with the gas by the ejector can be advantageously dispersed in the gas that passes through the base, so that the powder can be uniformly supplied to the cells of the base. Therefore, the method of producing a honeycomb filter according to one aspect of the invention can reliably coat the powder on the inner surface of the cells to a uniform thickness, so that the collection layer can be reliably formed on the inner surface of the cells to a uniform thickness. The ratio (B/A) of the flow rate B of the gas b to the flow rate A of the gas a is set to be less than 1. The ratio (B/A) is preferably ⅓ or less, and more preferably ¹⁄₁₀ or less. The air current ejected from the powder transfer section may undergo pulsation when transferring a large amount of powder. If the ratio (B/A) is ⅓ or less, the effect of pulsation on the flow rate distribution of the air current that passes through the workpiece can be reduced. Note that the flow rates A to C refer to flow rates per unit time.

DETAILED DESCRIPTION OF THE INVENTION

Figure 1A:
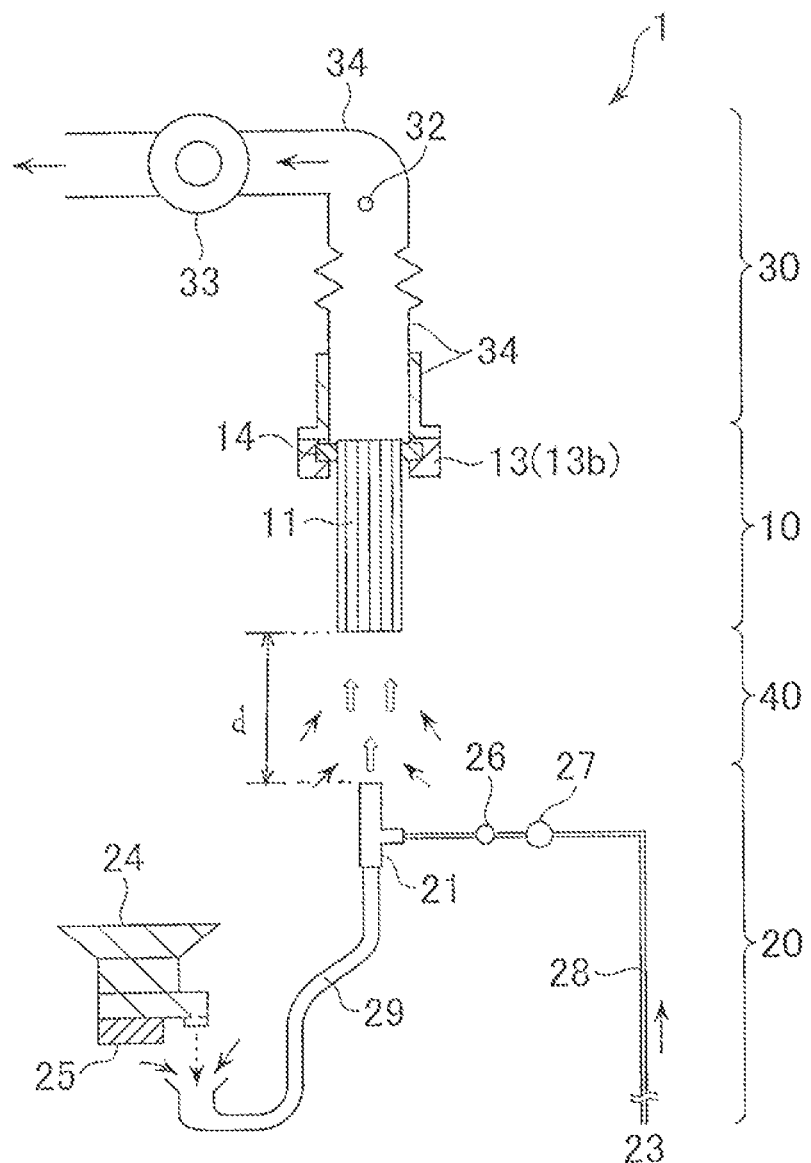
FIG. 1A is a schematic view showing a honeycomb filter production apparatus according to one embodiment of the invention.

Exemplary embodiments of the invention are described below with reference to the drawings. Note that the invention is not limited to the following embodiments. Various alterations, modifications, and improvements may be made of the following embodiments without departing from the scope of the invention based on the knowledge of a person having ordinary skill in the art. For example, although the drawings illustrate preferred embodiments of the invention, the invention is not limited to the embodiments or information illustrated in the drawings. Note that the invention may be practiced or verified by applying means similar or equivalent to means described herein, but preferred means are those described herein.

Figure 9A:
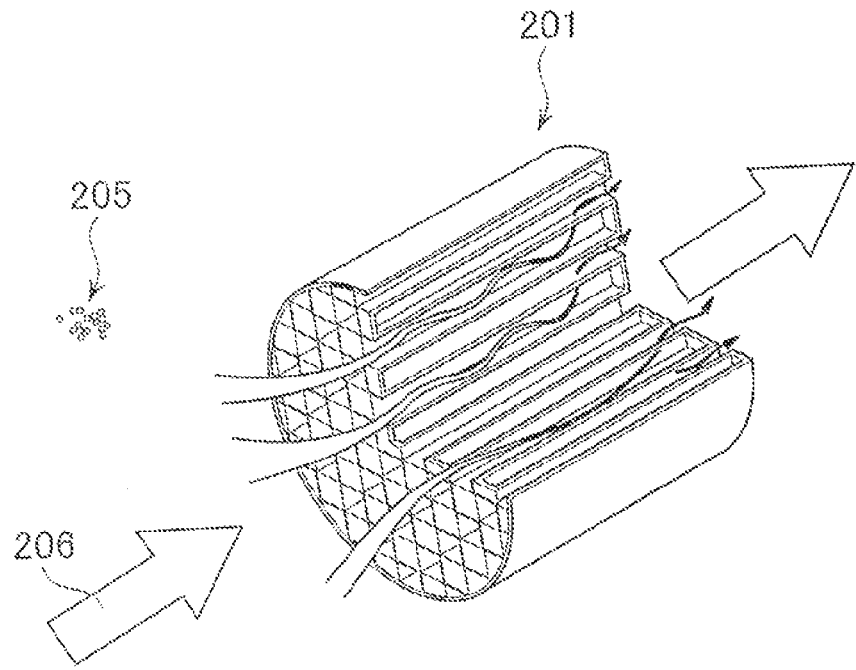
FIG. 9A is a view illustrative of the advantages of a honeycomb filter produced using a honeycomb filter production apparatus according to one embodiment of the invention (i.e., a perspective view showing ¼th of a honeycomb filter on which a (surface) collection layer is not provided)
Figure 9B:
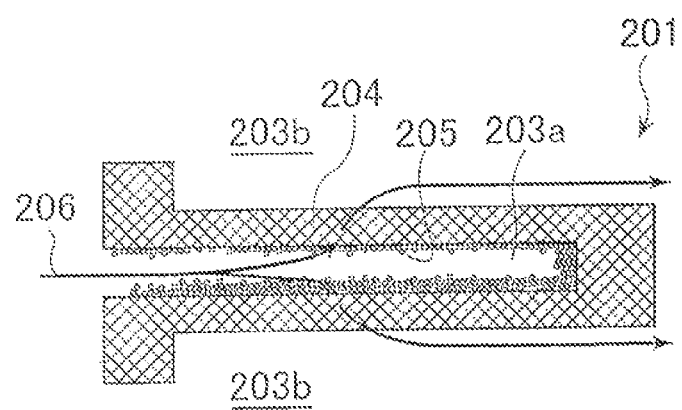
FIG. 9B is a view illustrative of the advantages of a honeycomb filter produced using a honeycomb filter production apparatus according to one embodiment of the invention (i.e., an enlarged cross-sectional view showing part (partition wall and cells) of a honeycomb filter on which a surface collection layer is not provided).

The advantages of a honeycomb filter that is produced using a honeycomb filter production apparatus according to one embodiment of the invention, and includes a collection layer formed (coated) thereon, are described below with reference to FIGS. 9A and 9B. When using a honeycomb filter 201 that is not provided with a collection layer as a PM removal filter, exhaust gas 206 containing PM 205 is introduced into a cell 203a, passes through a partition wall 204 of the honeycomb filter 201, and flows out from the honeycomb filter 201 through the open end of the adjacent cell 203b. The PM 205 is collected by the partition wall 204, so that the exhaust gas 206 is purified (see FIGS. 9A and 9B). However, when a collection layer is not provided on the surface of the partition wall 204, the PM 205 enters and clogs the pores in the partition wall 204 (base). As a result, a pressure loss rapidly increases in an early stage. When a collection layer is provided on the surface of the partition wall 204, the PM 205 does not enter and clog the pores in the partition wall 204 (base). This prevents a situation in which a pressure loss increases in an early stage (i.e., reduces a pressure loss). The honeycomb filter production apparatus according to one embodiment of the invention is a means that produces such an excellent honeycomb filter (provided with a collection layer).

The configuration and the materials of the honeycomb filter production apparatus according to one embodiment of the invention are described below. A honeycomb filter production apparatus 1 shown in FIG. 1A includes a workpiece securing section 10, a powder transfer section 20, a suction section 30, and an introduction section 40. In FIG. 1A (schematic view), an area around the workpiece securing section 10 is illustrated as a cross-sectional view. A workpiece 11 shown in FIG. 1A is a base (honeycomb filter precursor). The term "honeycomb filter precursor" refers to a honeycomb filter base on which a collection layer is formed (coated). FIG. 1A shows a state during coat. An arrow shown in FIG. 1A indicates the flow of a powder, aerosol, or gas (air). This also applies to FIGS. 1B to 4, 5A, and 6A.

The workpiece securing section 10 of the honeycomb filter production apparatus 1 secures the workpiece 11 (base). The workpiece 11 (honeycomb filter precursor) is a plugged honeycomb structure formed of a ceramic. Specifically, the workpiece 11 has a columnar external shape formed by an outer circumferential surface and two end faces, and includes a plurality of cells that extend from one end face to the other end face, the plurality of cells being defined by a partition wall that is formed of a ceramic porous body having a number of pores to form a honeycomb structure. Each cell serves as a gas (fluid) passage. The workpiece 11 is configured so that adjacent cells are alternately plugged at one open end and the other open end. Therefore, each end face (i.e., one end face and the other end face) of the workpiece 11 has a checkered pattern (staggered pattern).

The workpiece securing section 10 of the honeycomb filter production apparatus 1 includes a workpiece chuck 13 (13b). The workpiece chuck 13 (13b) is supported by a post, a frame, or the like (not shown), and holds (secures) the workpiece 11. The workpiece chuck 13 (13b) firmly holds (secures) the end of the outer circumferential surface of the workpiece 11 via a packing 14 (seal material) that is formed of a flexible material (e.g., polyurethane rubber or silicone rubber), and insulates (isolates) one end face of the workpiece 11 from the outer circumferential surface of the workpiece 11.

The powder transfer section 20 is disposed on one side of the workpiece securing section 10. The powder transfer section 20 disperses a powder for forming a collection layer on the workpiece 11 in gas to produce aerosol, and guides the aerosol to the workpiece 11. The powder transfer section 20 that produces the aerosol is positioned on the aerosol inlet side relative to the workpiece securing section 10. The powder transfer section 20 mainly includes an ejector 21, and a powder feeding device 24 that supplies a given amount of powder. The distance between the end face of the workpiece 11 (base) on the side of the powder transfer section 20 and the ejection end of the ejector 21 (powder transfer section 20) is the distance d.

The ejector 21 ejects a powder together with an air current. The ejector 21 preferably has a mechanism that sucks a powder by utilizing a negative pressure produced by a high-speed air current, and discharges the powder together with the air current. Specifically, the ejector 21 produces aerosol. A high-speed air current is supplied to the ejector 21 at a given flow rate from a pressurized gas feeding device 23 (e.g., compressor) (not shown) via a pipe 28 provided with a flowmeter 26 and a control valve 27. A powder is supplied to the ejector 21 at a given feed rate from the powder feeding device 24 provided with a gravimeter 25 (mass meter) via a tube 29. It is preferable that the ejector 21 suck a powder (see FIG. 1A). This suppresses occurrence of a bridge (arch) and a rat hole in the pipe and the ejector, and prevents a situation in which powder is not supplied to the ejector 21. A (ceramic) powder that forms the collection layer includes particles that easily aggregate (cohere). The ejector 21 is effective for causing the powder to reliably adhere to the inner surface of the cells, and preventing the powder from adhering to the pipe or the like when transferring the powder using an air current. It is more preferable that the powder suction direction be approximately parallel to the aerosol discharge direction.

In order to reduce wear of the ejector 21 due to friction caused by contact with the powder, it is preferable that the surface of the ejector 21 that comes in contact with the powder be formed using diamond, diamond-like carbon (DLC), titanium nitride (TiN), titanium carbonitride (TiCN), silicon carbonitride (SiCN), silicon carbide (SiC), silicon nitride (SiN), an ultrahard material, an alloy thereof, or a combination thereof. The surface of the ejector 21 may be coated, plated, or lined with these materials, for example.

A commercially available product may be used as the ejector 21, and a pipe may be connected to the main body thereof so that the ejection end extends therefrom. The diameter of the ejection end or a pipe connected to the ejector 21 may be increased in order to reduce the ejection flow rate. It is also preferable to provide a separation function to the ejector 21 or between the ejector 21 and a pipe connected thereto in order to remove large particles from the powder. The separation function may be implemented by increasing the diameter of a pipe connected to the ejector 21, producing a vortex flow, producing an upward air current by vertically disposing a pipe connected to the ejector 21, or inserting a screen mesh.

The powder feeding device 24 supplies (drops) a powder to the powder suction side of the ejector 21. The powder feeding device 24 is an automatic feeding device that can supply a given amount of powder. The powder feeding device 24 is preferably provided with the gravimeter 25 (mass meter). A volumeter may be used instead of the gravimeter. The powder feeding device 24 may have a screw feeding mechanism, a rotary feeding mechanism, a vibratory feeding mechanism, a table feeding mechanism, a belt feeding mechanism, or the like. The powder feeding device 24 is configured so that automatic feeding based on the time schedule can be implemented, the feed weight (mass) can be changed, and the feed rate (feed quantity/feed time) can be easily controlled.

The suction section 30 is disposed on the other side of the workpiece securing section 10. The suction section 30 sucks the aerosol ejected from the ejector 21 and mixed with gas (air) into the workpiece 11 (honeycomb filter precursor). The suction section 30 that sucks the aerosol into the workpiece 11 is positioned on the outlet side of the workpiece 11 relative to the workpiece securing section 10.

The suction section 30 mainly includes a suction machine 33 and a duct 34. The duct 34 is connected to the workpiece chuck 13b. The suction machine 33 is a fan, for example. A blower or a dust collector may also be used as the suction machine 33. The suction section 30 is preferably configured so that the suction flow rate can be controlled. For example, the suction flow rate can be controlled by variably controlling the rotational speed of an electric motor of the suction machine 33, or adjusting the diameter of the duct 34 (passage) using a valve or the like. For example, when the workpiece 11 is a honeycomb filter precursor used as a DPF installed in an automobile, the suction flow rate is preferably about 0.1 to 400 m$^3$/min.

The duct 34 (passage) of the suction section 30 is provided with an anemometer 32 that monitors the suction flow rate, and provides control data. The anemometer 32 is a hot-wire anemometer. A mechanical anemometer, a pitot tube anemometer, or the like may also be used as the anemometer 32. A filter may be disposed on the upstream side of the anemometer 32 in order to protect the anemometer 32 from the powder that has passed through the workpiece 11. A protective cover may be provided for the anemometer 32, or the anemometer 32 may be evacuated from the duct 34 when the aerosol is introduced. A blow nozzle for removing the powder adhering to the anemometer 32 may be disposed.

The honeycomb filter production apparatus 1 is configured so that the powder transfer section 20 is positioned on the lower side, and the suction section 30 is positioned on the upper side. Specifically, the aerosol is introduced into the lower side of the workpiece 11, and discharged from the upper side of the workpiece 11. An air current flows in the upward direction. Therefore, powder that does not adhere to the inner surface of the cells falls downward (i.e., can be easily collected).

The introduction section 40 of the honeycomb filter production apparatus 1 is an open space formed between the powder transfer section 20 and the workpiece securing section 10. The powder transferred from the powder transfer section 20 together with an air current is mixed with another gas in the introduction section 40, and introduced into the workpiece 11 secured by the workpiece securing section 10.

Figure 1B:
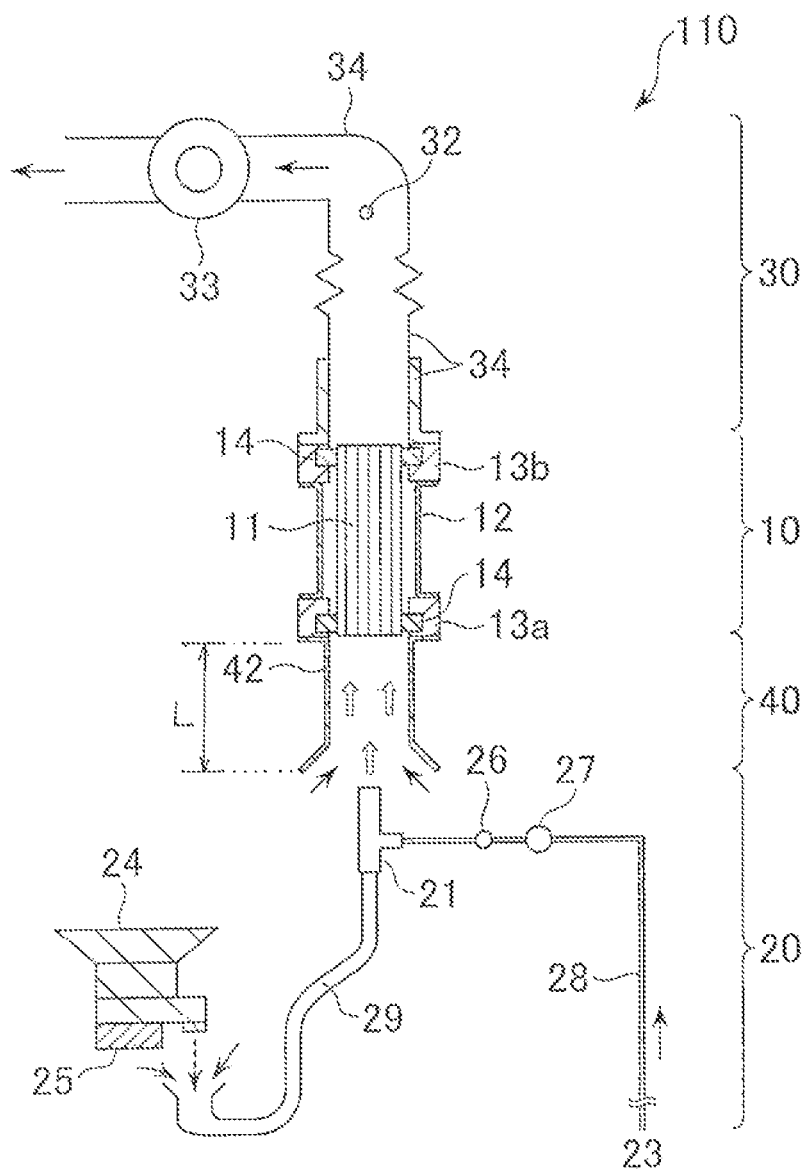
FIG. 1B is a schematic view showing a honeycomb filter production apparatus according to another embodiment of the invention.

A honeycomb filter production apparatus 110 shown in FIG. 1B is described below. The honeycomb filter production apparatus 110 includes a workpiece securing section 10, a powder transfer section 20, a suction section 30, and an introduction section 40 in the same manner as the honeycomb filter production apparatus 1, but differs from the honeycomb filter production apparatus 1 as to the configurations of the workpiece securing section 10 and the introduction section 40. The honeycomb filter production apparatus 110 is configured in the same manner as the honeycomb filter production apparatus 1 except for the configurations of the workpiece securing section 10 and the introduction section 40 (description of identical features is omitted).

The workpiece securing section 10 of the honeycomb filter production apparatus 110 includes workpiece chucks 13a and 13b, and a cover 12. The workpiece chucks 13a and 13b are supported by a post, a frame, or the like (not shown), and hold (secure) a workpiece 11. The cover 12 covers the outer circumferential surface (side surface) of the workpiece 11 so that gas does not enter the workpiece 11 through the outer circumferential surface of the workpiece 11. The cover 12 has an approximately columnar (cylindrical) shape similar to that of the workpiece 11. The material for the cover 12 is not particularly limited, but is preferably a metal, a resin, or the like.

The workpiece chucks 13a and 13b firmly hold (secure) the ends of the out circumferential surface of the workpiece 11 via a packing 14 (seal material) that is formed of a flexible material (e.g., polyurethane rubber or silicone rubber), and insulate (isolate) each end face of the workpiece 11 from the outer circumferential surface of the workpiece 11. Therefore, a stable air current flows through the entire workpiece 11 (over the entire end face). Each end face of the workpiece 11 may be insulated (isolated) from the outer circumferential surface of the workpiece 11 by inflating a balloon using an air pressure instead of using the packing 14. When the cells in which the collection layer is formed are positioned only in a center area of the workpiece 11 when viewed from the end face of the workpiece 11, each end face of the workpiece 11 may be held using a doughnut-shaped stage member while insulating (isolating) each end face of the workpiece 11 from the outer circumferential surface of the workpiece 11. Since an air current is produced by suction, the powder does not leak and pollute the environment even if a complete seal is not formed, and an air current and formation of the collection layer are affected to only a small extent.

A guide member 42 provided in the introduction section 40 has an approximately columnar (cylindrical) shape similar to that of the workpiece 11. The length of the guide member 42 is the length L, and the guide member 42 is secured on the workpiece securing section 10 (e.g., connected to the workpiece chucks 13a and 13b). The guide member 42 efficiently guides the aerosol ejected from the ejector 21 to the workpiece 11. The end of the guide member 42 opposite to the workpiece securing section 10 is open. Gas is sucked through the open end of the guide member 42 separately from the gas that is ejected from (passes through) the ejector 21. Specifically, the aerosol ejected from the ejector 21 is mixed with another gas (air), and introduced into the cells of the workpiece 11.

The guide member 42 is preferably formed of a metal, a resin, or the like in the same manner as the cover 12. Specific examples of the material for the guide member 42 include aluminum, stainless steel, brass, iron, an acrylic resin, vinyl chloride, nylon (polyamide resin), bakelite (phenol resin), and the like. It is particularly preferable to form the guide member 42 using a conductive material, and ground the guide member 42. In order to reduce wear of the guide member 42 due to friction caused by contact with the powder, it is also preferable that the surface of the guide member 42 that comes in contact with the powder be coated, plated, or lined with diamond, diamond-like carbon (DLC), TiN, TiCN, SiCN, an alloy thereof, or a combination thereof. SiC or an ultrahard material may also be preferably used.

Figure 1C:
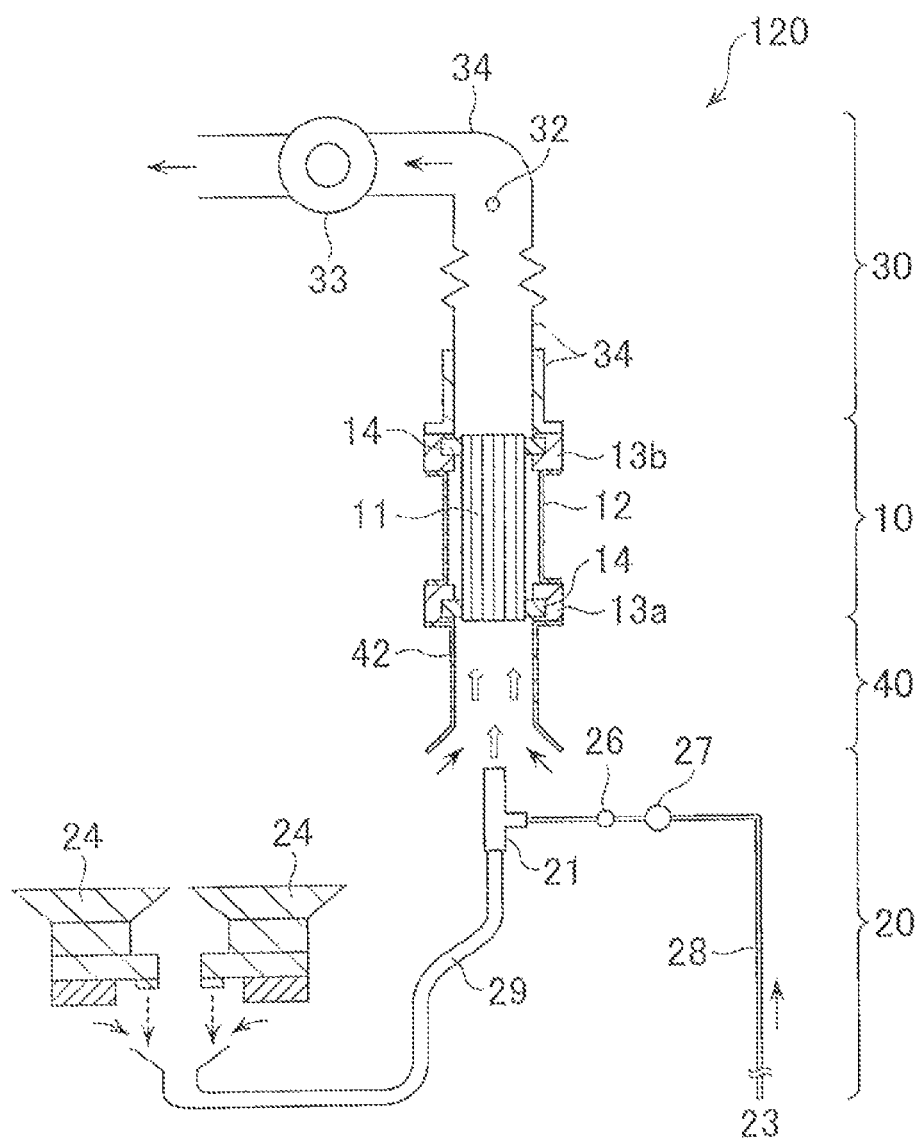
FIG. 1C is a schematic view showing a honeycomb filter production apparatus according to still another embodiment of the invention.

A honeycomb filter production apparatus 120 shown in FIG. 1C is described below. The honeycomb filter production apparatus 120 differs from the honeycomb filter production apparatus 110 in that the powder transfer section 20 includes two (or three or more) powder feeding devices 24. The honeycomb filter production apparatus 120 is configured in the same manner as the honeycomb filter production apparatus 110 except for the above feature (description of identical features is omitted). According to the honeycomb filter production apparatus 120, two (or three or more) types of powders supplied from the powder feeding devices 24 can be mixed by the ejector 21, and introduced into the workpiece 11.

Figure 1D:
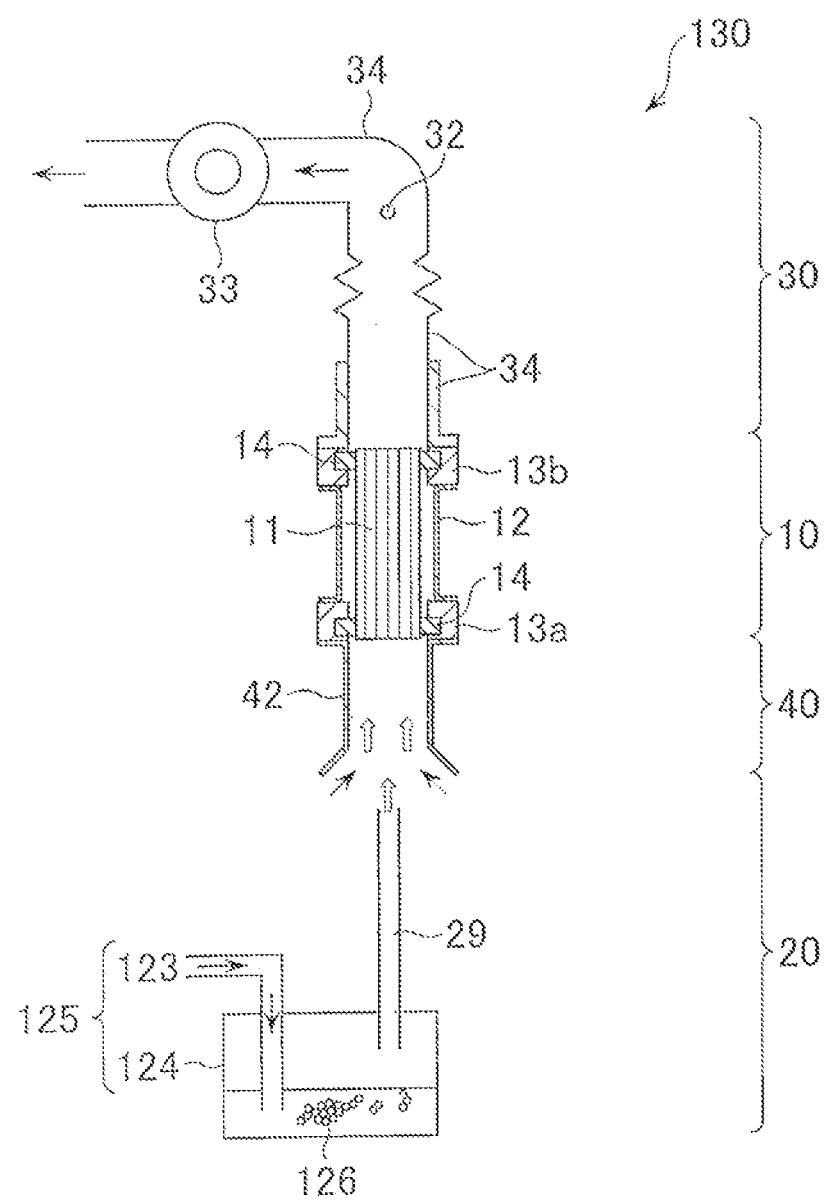
FIG. 1D is a schematic view showing a honeycomb filter production apparatus according to still another embodiment of the invention.

A honeycomb filter production apparatus 130 shown in FIG. 1D is described below. The honeycomb filter production apparatus 130 differs from the honeycomb filter production apparatus 110 in that an aerosol-producing chamber 125 is provided instead of the ejector 21 and the powder feeding device 24. The honeycomb filter production apparatus 130 is configured in the same manner as the honeycomb filter production apparatus 110 except for the above feature (description of identical features is omitted). The aerosol-producing chamber 125 mainly includes a container 124 that contains stirring beads 126 and a powder. Pressurized gas is blown into the aerosol-producing chamber 125 from a pressurized gas supply device 123 (e.g., compressor) (not shown) via a pipe, and stirred, so that the powder floats and is dispersed in the gas to produce aerosol. The aerosol is introduced into the workpiece 11 via a tube 29 due to suction by the suction section 30.

The configurations and the materials of honeycomb filter production apparatuses shown in FIGS. 2 to 4 and 10 are described below. The honeycomb filter production apparatuses shown in FIGS. 2 to 4 include a workpiece securing section, a powder transfer section, a suction section, and an introduction section in the same manner as the honeycomb filter production apparatus 1. Description of elements of the honeycomb filter production apparatuses shown in FIGS. 2 to 4 similar (identical) to those of the honeycomb filter production apparatus 1 is omitted.

Figure 2:
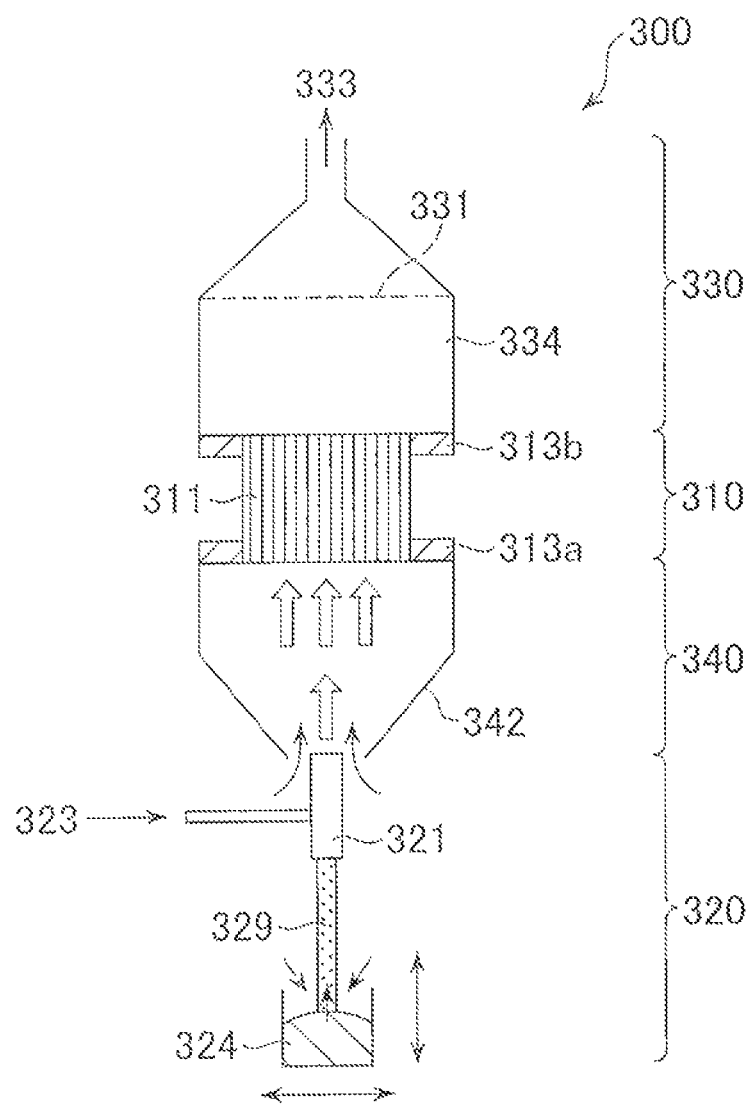
FIG. 2 is a schematic view showing a honeycomb filter production apparatus according to still another embodiment of the invention.

A honeycomb filter production apparatus 300 shown in FIG. 2 includes a workpiece securing section 310, a powder transfer section 320, a suction section 330, and an introduction section 340. The workpiece securing section 310 of the honeycomb filter production apparatus 300 secures a workpiece 311 (base). The workpiece 311 is secured using workpiece chucks 313a and 313b. The workpiece 311 (honeycomb filter precursor) is (for example) a columnar plugged honeycomb segment formed of cordierite.

The powder transfer section 320 mainly includes an ejector 321, and a powder container 324. The ejector 321 has a mechanism that sucks a powder by utilizing a negative pressure produced by a high-speed air current, and discharges the powder together with the air current. Specifically, the ejector 321 produces aerosol. The high-speed air current is supplied to the ejector 321 from a pressurized gas supply device 323 (not shown). The powder is supplied to the ejector 321 from the container 324 via a tube 329.

A desired mass of powder is weighed into the container 324. The powder contained in the container 324 is sucked by the ejector 321. The powder may be sucked while moving (scanning) the tube 329 or the container 324. The scan operation may be performed manually, or may be performed using an automatic stage. The feed rate of the powder may be changed by controlling the scan speed.

A guide member 342 of the introduction section 340 has an approximately columnar (cylindrical) shape similar to that of the workpiece 311 having a large diameter. The guide member 342 is secured on the workpiece securing section 310 (e.g., connected to the workpiece chucks 313a and 313b). The narrow end of the guide member 342 opposite to the workpiece securing section 310 is open. Gas is sucked through the open end of the guide member 342 separately from the gas that is ejected from (passes through) the ejector 321. Specifically, the aerosol ejected from the ejector 321 is mixed with another gas (air), and introduced into the cells of the workpiece 311.

The suction section 330 mainly includes a suction machine 333, a duct 334, and a current plate 331. The duct 334 having an approximately columnar (cylindrical) shape similar to that of the workpiece 311 is secured on the workpiece securing section 310 (e.g., connected to the workpiece chuck 313b). The current plate 331 is provided inside the duct 334 perpendicular to the air current. The current plate 331 equalizes the flow rate in all of the cells at the outlet-side end face of the workpiece 311. The current plate 331 is formed of a perforated metal. A screen mesh or the like may also be used as the current plate 331.

Figure 3:
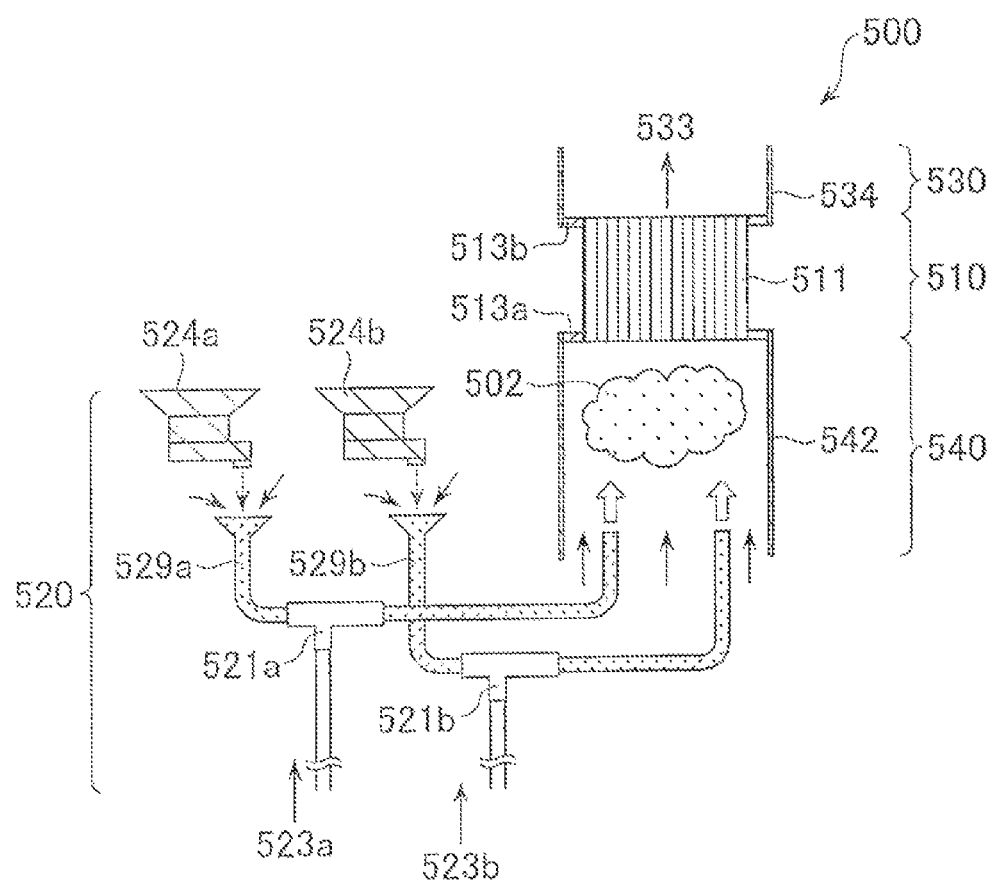
FIG. 3 is a schematic view showing a honeycomb filter production apparatus according to still another embodiment of the invention.

A honeycomb filter production apparatus 500 shown in FIG. 3 includes a workpiece securing section 510, a powder transfer section 520, a suction section 530, and an introduction section 540. The workpiece securing section 510 of the honeycomb filter production apparatus 500 secures a workpiece 511 (base). The workpiece 511 is secured using workpiece chucks 513a and 513b. The workpiece 511 (honeycomb filter precursor) is (for example) a columnar plugged honeycomb segment formed of cordierite in the same manner as the workpiece 311. The workpiece 511 has a large diameter as compared with the dimension in the axial direction (cell extension (length) direction).

The powder transfer section 520 mainly includes two ejectors 521a and 521b, and two powder feeding devices 524a and 524b. The ejectors 521a and 521b have a mechanism that sucks a powder by utilizing a negative pressure produced by a high-speed air current, and discharges the powder together with the air current. Specifically, the ejectors 521a and 521b produce different types of aerosol. The high-speed air current is supplied to the ejectors 521a and 521b respectively from pressurized gas supply devices 523a and 523b (not shown). The powder is supplied to the ejectors 521a and 521b respectively from the powder feeding devices 524a and 524b via tubes 529a and 529b having a trumpet-shaped opening (inlet). A problem (e.g., segregation or a change in particle size distribution) can be prevented when feeding powders formed of different ceramic materials by providing the ejectors 521a and 521b and the powder feeding devices 524a and 524b. It is also possible to change (control) the feed rates of the powder feeding devices 524a and 524b with time. Moreover, a large amount of powder can be supplied within a short time as compared with the case of using one ejector and one powder feeding device. Note that the powder may be supplied to one inlet from two powder feeding devices.

A guide member 542 of the introduction section 540 has an approximately columnar (cylindrical) shape similar to that of the workpiece 511. The guide member 542 is secured on the workpiece securing section 510. The end of the guide member 542 opposite to the workpiece securing section 510 is open. Gas is sucked through the open end of the guide member 542 separately from the gas that is ejected from (passes through) the ejectors 521a and 521b. Specifically, the aerosol ejected from each of the ejectors 521a and 521b is mixed with another gas (air) to produce aerosol 502, and the aerosol 502 is introduced into the cells of the workpiece 511. Note that the aerosol shown in FIGS. 3 and 4 is omitted in the remaining drawings.

The suction section 530 mainly includes a suction machine 533 and a duct 534. The duct 534 is secured on the workpiece securing section 510 (workpiece chuck 513b). The area of the duct 534 secured on the workpiece securing section 510 has an approximately columnar shape having a size corresponding to the columnar workpiece 511.

Figure 4:
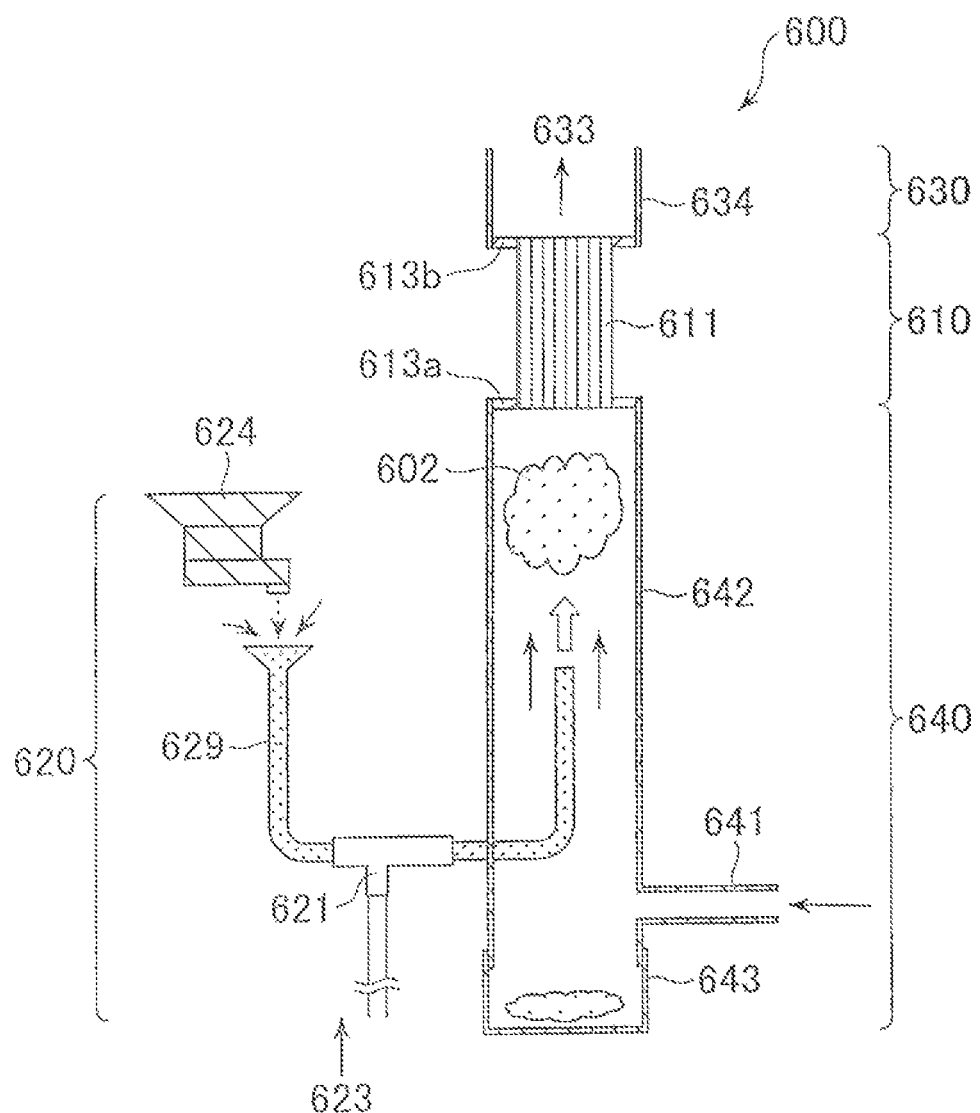
FIG. 4 is a schematic view showing a honeycomb filter production apparatus according to still another embodiment of the invention.

A honeycomb filter production apparatus 600 shown in FIG. 4 includes a workpiece securing section 610, a powder transfer section 620, a suction section 630, and an introduction section 640. The workpiece securing section 610 of the honeycomb filter production apparatus 600 secures a workpiece 611 (base). The workpiece 611 is secured using workpiece chucks 613a and 613b. The workpiece 611 (honeycomb filter precursor) is (for example) a prismatic plugged honeycomb segment formed of SiC.

The powder transfer section 620 mainly includes an ejector 621, and a powder feeding device 624. The ejector 621 has a mechanism that sucks a powder by utilizing a negative pressure produced by a high-speed air current, and discharges the powder together with the air current. Specifically, the ejector 621 produce aerosol. The high-speed air current is supplied to the ejector 621 from a pressurized gas supply device 623 (not shown). The powder is supplied to the ejector 621 from the powder feeding device 624 via a tube 629 having a trumpet-shaped opening.

A guide member 642 of the introduction section 640 has an approximately prismatic shape similar to that of the workpiece 611. The guide member 642 is secured on the workpiece securing section 610. A powder-collecting container 643 is secured on the end of the guide member 642 opposite to the workpiece securing section 610. An air inlet 641 is provided on the side surface of the guide member 642. Gas is sucked through the air inlet 641 separately from the gas that is ejected from (passes through) the ejector 621. Specifically, the aerosol ejected from the ejector 621 is mixed with another gas (air) to produce aerosol 602, and the aerosol 602 is introduced into the cells of the workpiece 611. The powder that does not adhere to the workpiece 611 is collected into the powder-collecting container 643. The air inlet 641 may be provided with a gas flow rate control mechanism (e.g., valve) or a flowmeter.

The suction section 630 mainly includes a suction machine 633 (not illustrated) and a duct 634. The duct 634 is secured on the workpiece securing section 610 (by the workpiece chuck 613b).

Figure 10:
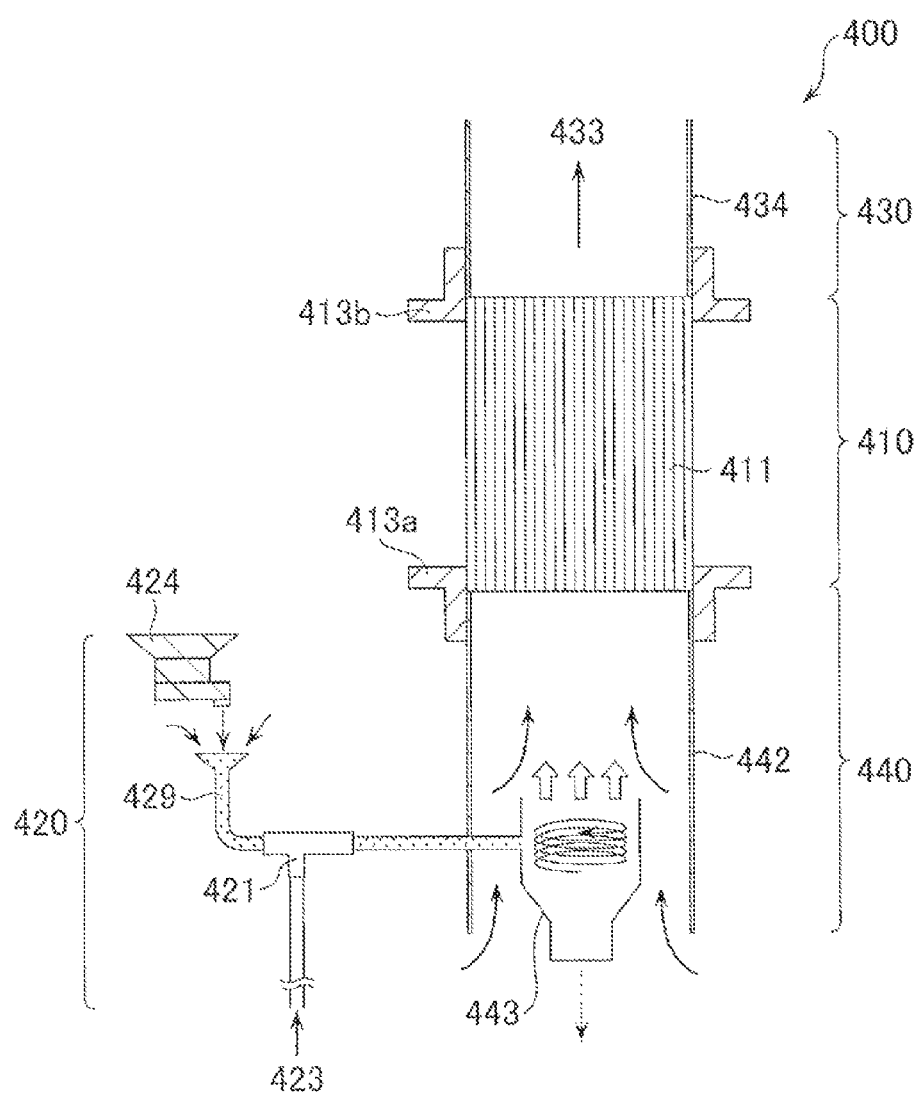
FIG. 10 is a schematic view showing still another embodiment of a honeycomb filter production apparatus of the present invention.

The honeycomb filter production apparatus 400 shown in FIG. 10 includes a workpiece securing section 410, a powder transfer section 420, a suction section 430, and an introduction section 440. The workpiece securing section 410 of the honeycomb filter production apparatus 400 is a section for securing the workpiece 411 (base) and secures the workpiece 411 by the workpiece chucks 413a and 413b. The workpiece 411 (honeycomb filter precursor) is (for example) a circular columnar plugged honeycomb segment formed of cordierite in the same manner as the workpieces 311 and 511 described above.

The powder transfer section 420 mainly includes an ejector 421 and a powder feeding device 424. The ejector 421 has a mechanism that sucks a powder by utilizing a negative pressure produced by a high-speed air current and discharges the powder together with the air current. That is, the ejector 421 produces aerosol. The high-speed air current is supplied to the ejector 421 from a pressurized gas supply device 423 not shown in FIG. 10. The powder is supplied to the ejector 421 from the powder feeding device 424 via a tube 429 having a trumpet-shaped opening.

A guide member 442 of the introduction section 440 has an approximately columnar (cylindrical) shape similar to that of the workpiece 411. The guide member 442 is secured on the workpiece securing section 410 (by the workpiece chuck 413b). A speed adjustment cylinder 443 (speed adjusting means) is provided inside the guide member 442. The speed adjustment cylinder 443 is a circular cylindrical member where one opening (lower side opening in FIG. 10) is narrowed to have a tapered shape. The speed adjustment cylinder 443 is connected to the ejector 421 in such a manner that the air current enters speed adjustment cylinder 443 from the direction almost perpendicular to the axial direction (from the horizontal direction in FIG. 10) of the speed adjustment cylinder 443. This constitution makes the aerosol ejected from the ejector 421 swirl in the speed adjustment cylinder 443, and thereby the speed is adjusted (reduced). By the speed adjustment, the powder is classified, and large (coarse) particles fall to be separated. On the other hand, a gas other than the gas passing through the ejector 421 is sucked from the opening (lower side in FIG. 10) of the guide member 442 and mixed with the aerosol ejected from the ejector 421 to form a new aerosol, which is introduced to the cells in the workpiece 411.

Figure 11:
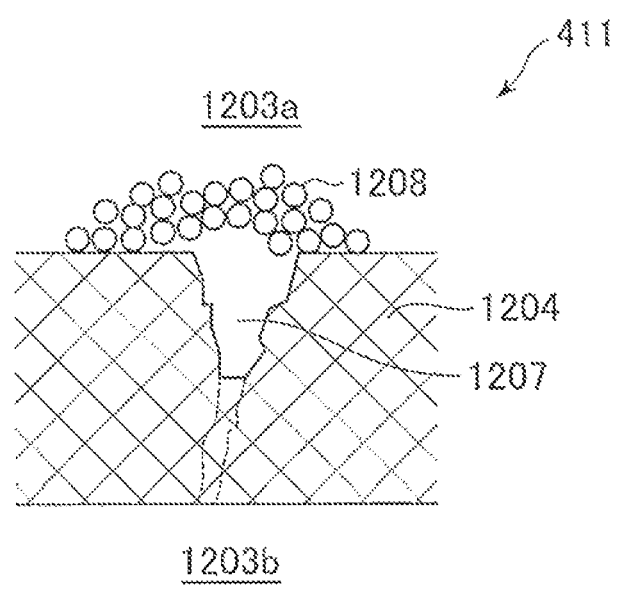
FIG. 11 is a cross-sectional view showing an enlarged part (partition wall and cell) of a honeycomb filter with no (surface) collection layer provided thereon to explain the effect of a honeycomb filter production apparatus of the present invention.
Figure 12:
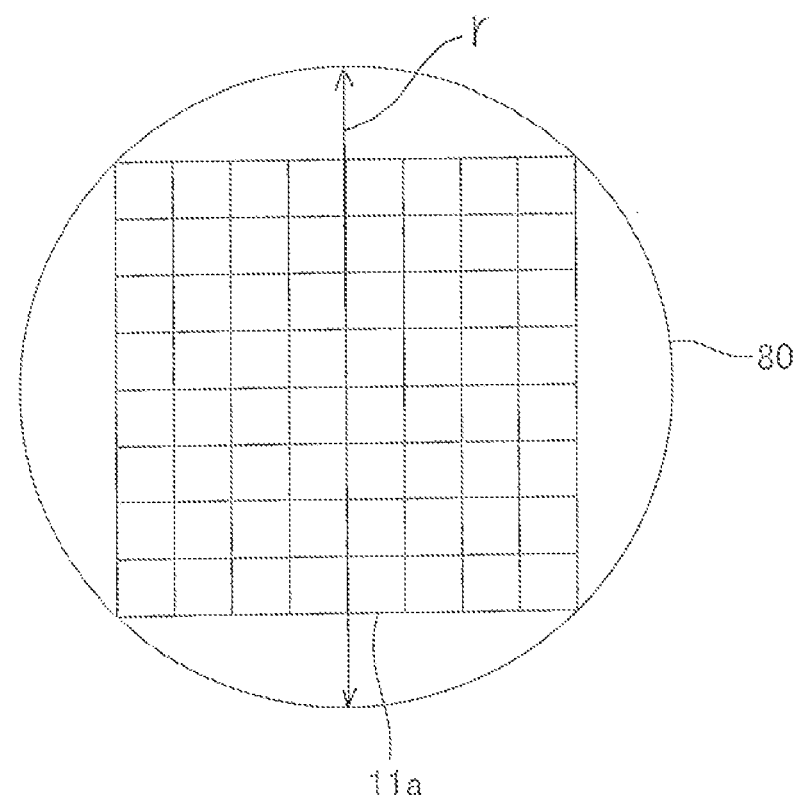
FIG. 12 is an explanatory view showing an end face of a base (workpiece) and an example of a minimum circle that includes the end face of the base on the side of the powder transfer section.

The aerosol containing the powder is introduced into a cell 1203a, passes through a partition wall 1204 of the workpiece 411, and flows out from the workpiece 411 through the open end of the adjacent cell 1203b. And, as described above, the speed of the aerosol (air current for transferring the powder) is reduced, the speed of the air current passing through the workpiece 411 is also reduced. By this adjustment (extend of reduction) of the speed of the air current, as shown in FIG. 11, the powder 1208 adheres so as to link a surface with a surface (i.e., in a bridge fashion, or like a bridge) of the partition wall 1204 on the upper side of a pore 1207 (in FIG. 11) with no powder 1208 entering the inside of the pore 1207 formed in the partition wall 1204 of the workpiece 411 (base).

The suction section 430 mainly includes a suction machine 433 (not illustrated) and a duct 434. The duct 434 is secured on the workpiece securing section 410 (by the workpiece chuck 413b).

When using the honeycomb filter production apparatuses shown in FIGS. 1A to 4 and 10, the workpiece may be secured on the workpiece securing section by a manual operation, an automatic transfer operation using a robot hand, a continuous automatic transfer operation using a transfer device provided in the workpiece securing section, or the like.

When using the honeycomb filter production apparatus 110, for example, the workpiece may be secured on the workpiece securing section by a manual operation by loosening the workpiece chucks 13a and 13b, placing the workpiece 11 in position, and tightening the workpiece chucks 13a and 13b to secure the workpiece 11. In the honeycomb filter production apparatus 110, the workpiece chucks 13a and 13b of the workpiece securing section 10 are supported by a post, a frame, or the like, but may be secured on the introduction section 40 and the suction section 30, respectively. In this case, the introduction section 40 on which the workpiece chuck 13a is secured and the suction section 30 on which the workpiece chuck 13b is secured are disposed at an interval to form a space. The workpiece 11 is placed in the space formed by the introduction section 40 and the suction section 30, and the introduction section 40 on which the workpiece chuck 13a is secured and the suction section 30 on which the workpiece chuck 13b is secured are moved closer to secure the workpiece 11 using the workpiece chucks 13a and 13b.

An example of an automatic transfer operation using a robot hand, or a continuous automatic transfer operation using a transfer device provided in the workpiece securing section, employed for the honeycomb filter production apparatus according to one embodiment of the invention is described in detail below with reference to FIGS. 5A to 6B. A honeycomb filter production apparatus shown in FIGS. 5A to 6B includes a workpiece securing section, a powder transfer section, a suction section, and an introduction section, and is configured in the same manner as the honeycomb filter production apparatus 110.

Figure 5A:
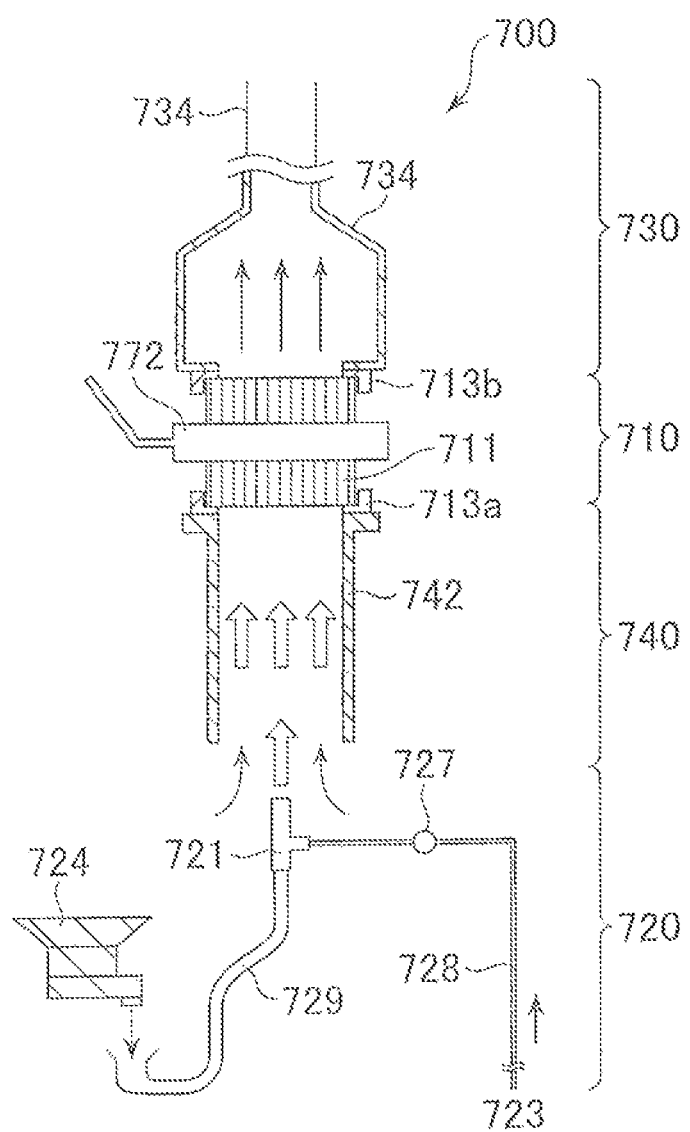
FIG. 5A is a schematic view showing a honeycomb filter production apparatus according to still another embodiment of the invention.
Figure 5B:
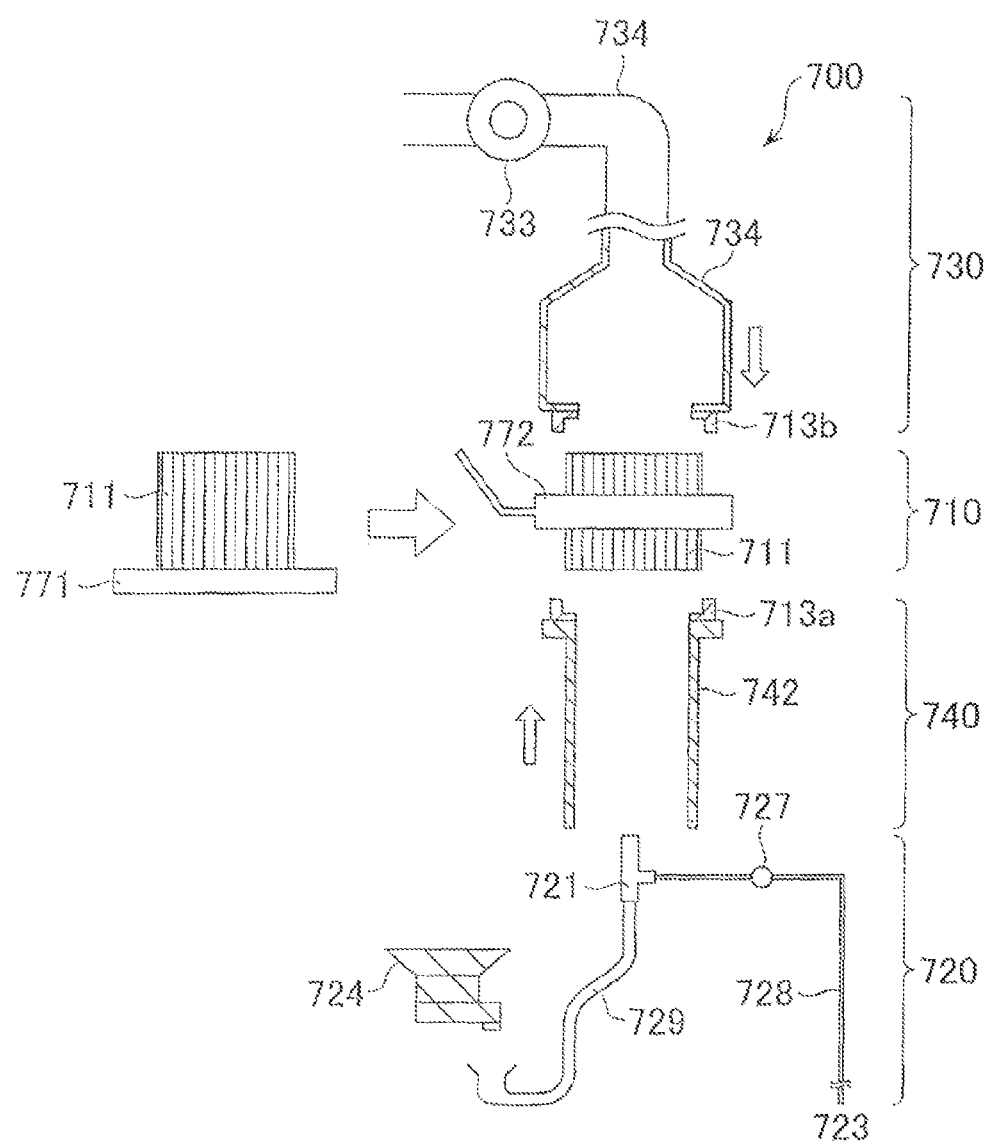
FIG. 5B is a schematic view showing a state in which a workpiece is secured on a workpiece securing section of the honeycomb filter production apparatus shown in FIG. 5A.

A honeycomb filter production apparatus 700 shown in FIGS. 5A and 5B includes a workpiece securing section 710, a powder transfer section 720, a suction section 730, and an introduction section 740. FIG. 5B is a view showing an automatic transfer operation using a robot hand. The powder transfer section 720 of the honeycomb filter production apparatus 700 mainly includes an ejector 721, and a powder feeding device 724. A high-speed air current is supplied to the ejector 721 at a given flow rate from a pressurized gas feeding device 723 (e.g., compressor) via a pipe 728 provided with a control valve 727. A powder is supplied to the ejector 721 at a given feed rate from the powder feeding device 724 via a tube 729, and ejected from the ejector 21 together with the air current. The suction section 730 mainly includes a suction machine 733 and duct 734. The suction section 730 sucks the aerosol ejected from the ejector 721 and mixed with gas (air) into a workpiece 711 (honeycomb filter precursor). The introduction section 740 includes a guide member.

The workpiece securing section 710 of the honeycomb filter production apparatus 700 secures the workpiece 711 (base). A workpiece 711 placed on a workpiece support 771 is sequentially held by a robot hand 772, and transferred to the workpiece securing section 710. A workpiece chuck 713a secured on the introduction section 740 then moves upward, and a workpiece chuck 713b secured on the suction section 730 moves downward, so that the workpiece 711 is secured (see FIG. 5B). The workpiece 711 (honeycomb filter precursor) is a columnar plugged honeycomb segment formed of cordierite.

Figure 6A:
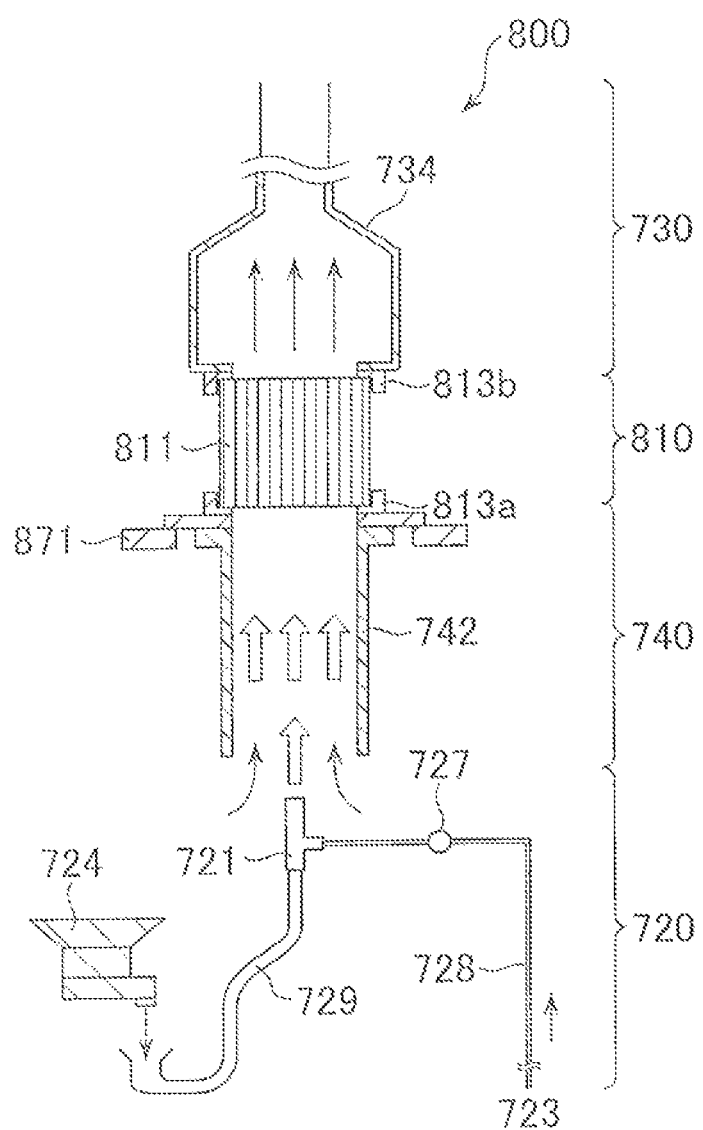
FIG. 6A is a schematic view showing a honeycomb filter production apparatus according to still another embodiment of the invention.
Figure 6B:
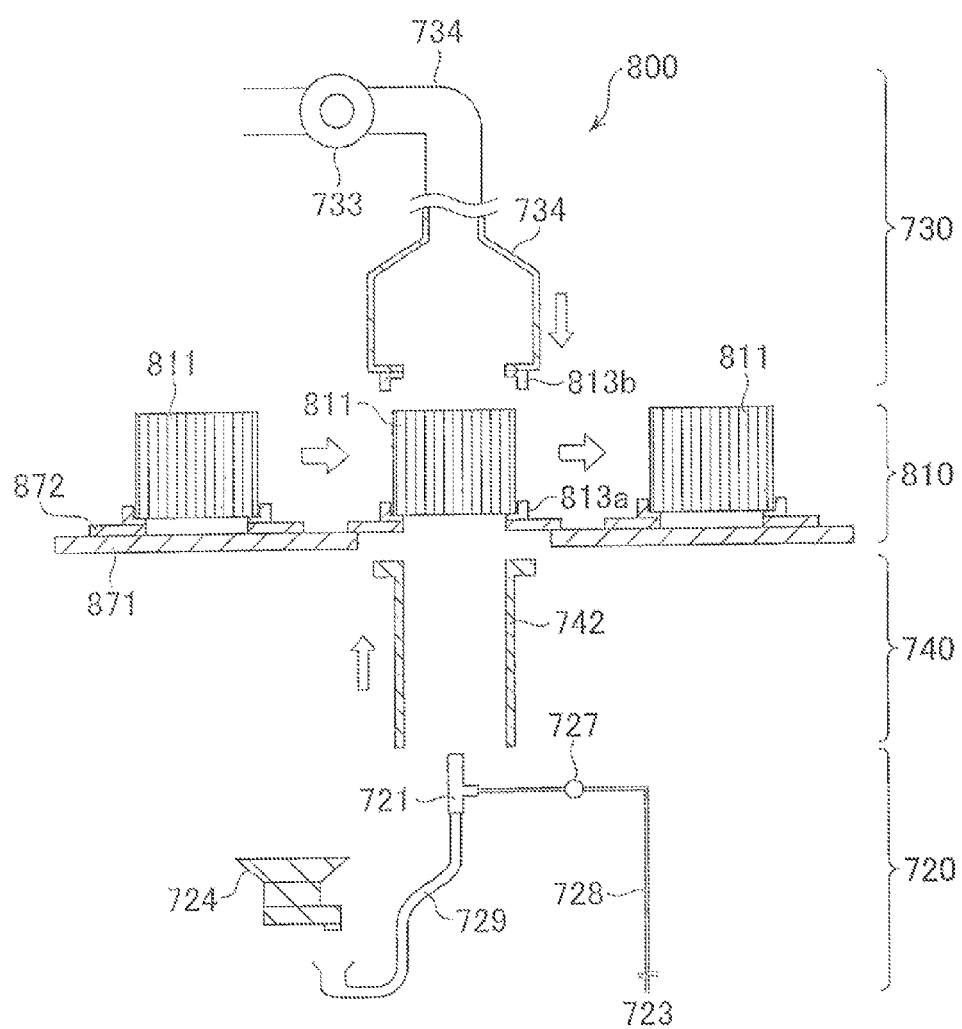
FIG. 6B is a schematic view showing a state in which a workpiece is secured on a workpiece securing section of the honeycomb filter production apparatus shown in FIG. 6A.

A honeycomb filter production apparatus 800 shown in FIGS. 6A and 6B includes a workpiece securing section 810, a powder transfer section 720, a suction section 730, and an introduction section 740. The powder transfer section 720, the suction section 730, and the introduction section 740 are configured in the same manner as those of the honeycomb filter production apparatus 700. FIG. 6B is a view showing a continuous automatic transfer operation using a transfer device provided in the workpiece securing section.

The workpiece securing section 810 of the honeycomb filter production apparatus 800 secures a workpiece 811 (base). A plurality of workpieces 811 placed on a transfer device 871 are sequentially moved to the workpiece securing section 810 by the transfer device 871. A pallet 872 is provided on the transfer device 871. A workpiece chuck 813a is secured on the pallet 872. The workpiece 811 placed on the transfer device 871 is held by the workpiece chuck 813a in advance. The honeycomb filter production apparatus 800 is configured so that the transfer device 871 stops when the workpiece 811 has entered the workpiece securing section 810, and a workpiece chuck 813b secured on the suction section 730 moves downward, so that the workpiece 811 is secured by the workpiece chucks 813a and 813b. The workpiece chuck 813b moves upward (returns) when the collection layer has been formed, and the transfer device 871 moves the next workpiece 811 to the workpiece securing section 810. This operation is repeated. The transfer device is a conveyer, for example. The transfer device may be a combination of a rail and a truck. The workpiece 811 (honeycomb filter precursor) is a columnar plugged honeycomb segment formed of cordierite.

When the introduction section of the honeycomb filter production apparatus according to one embodiment of the invention includes a tubular guide member, it is preferable to take measures to prevent a situation in which the powder for forming the collection layer adheres to the inner circumferential surface of the guide member. If the powder for forming the collection layer adheres to the inner circumferential surface of the guide member, the powder may be removed from the inner circumferential surface of the guide member at an unintended timing, and introduced into the workpiece. This may result in a variation in the amount of powder coated on each workpiece. Moreover, if the powder that should be coated on the inner surface of the cells (i.e., the surface of the partition wall) of the workpiece (coat) adheres to the inner circumferential surface of the guide member, the yield with respect to the raw material may decrease, or may vary depending on the workpiece.

Honeycomb filter production apparatuses shown in FIGS. 7A to 7D are provided with measures to prevent a situation in which the powder for forming the collection layer adheres to the inner circumferential surface of the guide member. These embodiments are described below.

Figure 7A:
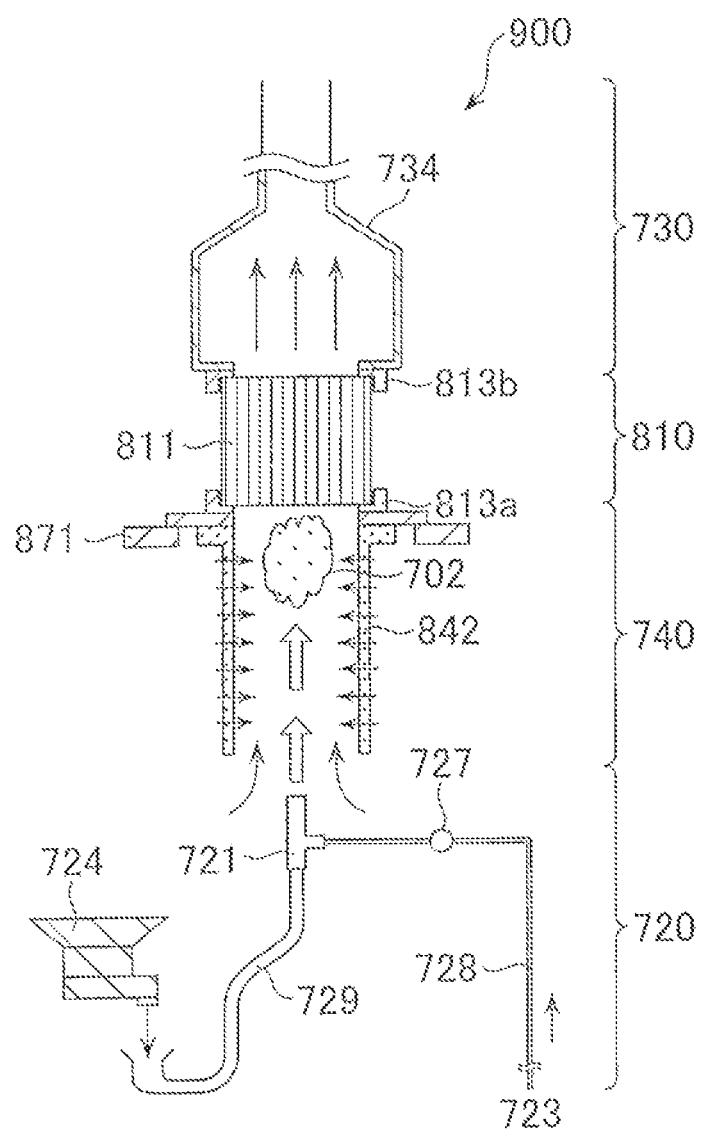
FIG. 7A is a schematic view showing a honeycomb filter production apparatus according to still another embodiment of the invention.

A honeycomb filter production apparatus 900 shown in FIG. 7A includes the workpiece securing section 810, the powder transfer section 720, the suction section 730, and the introduction section 740 in the same manner as the honeycomb filter production apparatus 800 shown in FIGS. 6A and 6B, but differs from the honeycomb filter production apparatus 800 in that a tubular porous body is used as the guide member 842 of the introduction section 740. The honeycomb filter production apparatus 900 is configured in the same manner as the honeycomb filter production apparatus 800 except for the above feature (description of identical features is omitted).

When the introduction section 740 includes the tubular guide member 842 formed of a porous body, a situation in which the powder for forming the collection layer adheres to the inner circumferential surface of the guide member can be effectively prevented. Specifically, when coating the powder for forming the collection layer on the inner surface of the cells (i.e., the surface of the partition wall) of the workpiece 811 using the honeycomb filter production apparatus 900, a small amount of gas (e.g., air) is blown against the outer circumferential surface of the guide member 842. Since the guide member 842 is formed of a porous body, the gas blown against the outer circumferential surface of the guide member 842 partially passes through the pores in the guide member 842, and is discharged to the inside of the guide member 842 from the inner circumferential surface of the guide member 842. A situation in which the powder for forming the collection layer (i.e., the powder contained in the aerosol ejected from the ejector 721) adheres to the inner circumferential surface of the guide member 842 is prevented by the gas discharged to the inside of the guide member 842 from the inner circumferential surface of the guide member 842.

A variation in the amount of powder coated on each workpiece can be suppressed while improving the yield with respect to the raw material by thus preventing a situation in which the powder for forming the collection layer adheres to the inner circumferential surface of the guide member 842.

Note that the gas discharged to the inside of the guide member 842 from the inner circumferential surface of the guide member 842 is mixed with the aerosol ejected from the ejector 721 to produce aerosol 702, which is introduced into the workpiece 811. The guide member 842 (i.e., tubular porous body) of the honeycomb filter production apparatus 900 is preferably formed of a ceramic such as silicon carbide.

Figure 7B:
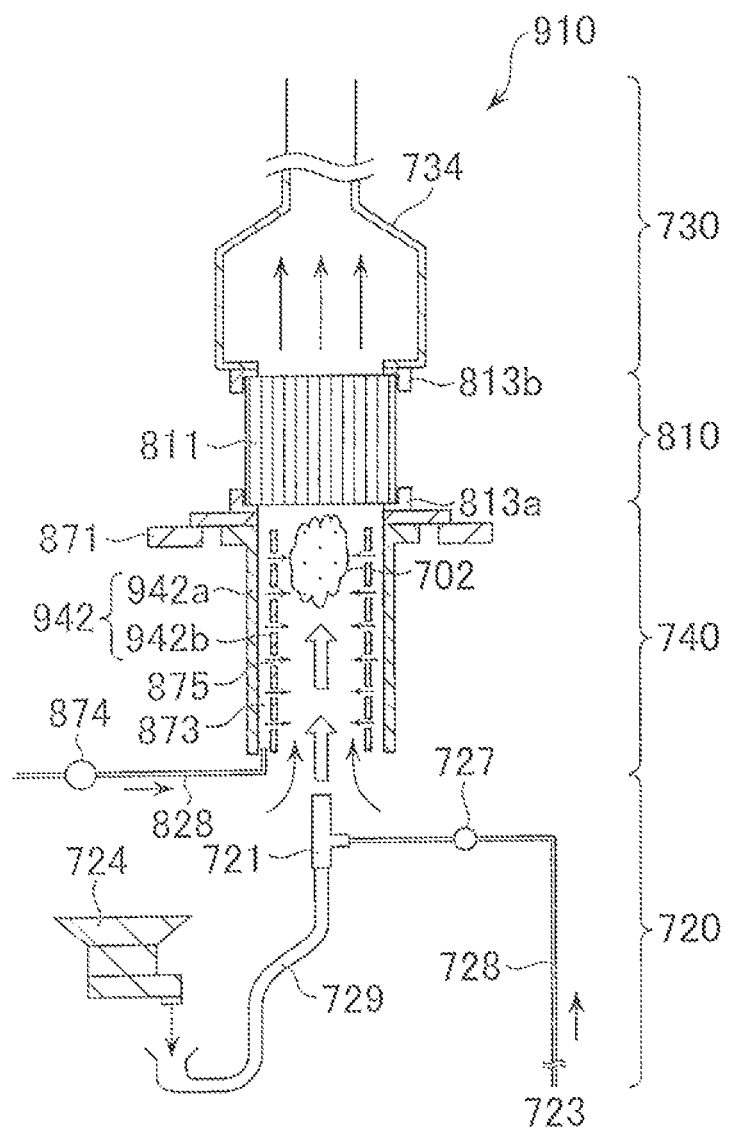
FIG. 7B is a schematic view showing a honeycomb filter production apparatus according to another embodiment of the invention.

A honeycomb filter production apparatus 910 shown in FIG. 7B includes the workpiece securing section 810, the powder transfer section 720, the suction section 730, and the introduction section 740 in the same manner as the honeycomb filter production apparatus 800 shown in FIGS. 6A and 6B, but differs from the honeycomb filter production apparatus 800 in that a guide member 942 of the introduction section 740 includes an outer tube section 942a, and an inner tube section 942b that has a number of holes 875 and is disposed inside the outer tube section 942a at a given interval from the outer tube section 942a, and the introduction section 740 includes a gas supply means that supplies gas (e.g., air) to a space 873 between the outer tube section 942a and the inner tube section 942b from the outside of the guide member 942. The honeycomb filter production apparatus 910 is configured in the same manner as the honeycomb filter production apparatus 800 except for the above features (description of identical features is omitted).

The gas supply means of the honeycomb filter production apparatus 910 includes a pipe 828 that extends from the outside of the guide member 942 to the space 873 between the outer tube section 942a and the inner tube section 942b of the guide member 942, and a pump 874 for supplying gas to the space 873 from the outside of the guide member 942 via the pipe 828.

When coating the powder for forming the collection layer on the inner surface of the cells (i.e., the surface of the partition wall) of the workpiece 811 using the honeycomb filter production apparatus 910, a small amount of gas is supplied to the space 873 from the outside of the guide member 942 via the pipe 828 by driving the pump 874. The gas supplied to the space 873 is discharged to the inside of the guide member 942 (inner tube section 942b) through the holes 875 formed in the inner tube section 942b. A situation in which the powder for forming the collection layer (i.e., the powder contained in the aerosol ejected from the ejector 721) adheres to the inner circumferential surface of the guide member 942 (inner tube section 942b) is prevented by the gas discharged to the inside of the guide member 942 (inner tube section 942b).

A variation in the amount of powder coated on each workpiece can be suppressed while improving the yield with respect to the raw material by thus preventing a situation in which the powder for forming the collection layer adheres to the inner circumferential surface of the guide member 942.

Note that the gas discharged to the inside of the guide member 942 through the holes 875 formed in the inner tube section 942b is mixed with the aerosol ejected from the ejector 721 to produce the aerosol 702, which is introduced into the workpiece 811. The outer tube section 942a of the guide member 942 of the honeycomb filter production apparatus 910 is preferably formed of a meta, a resin, or the like. The inner tube section 942b of the guide member 942 is preferably formed using a porous material (e.g., perforated metal or screen mesh).

Figure 7C:
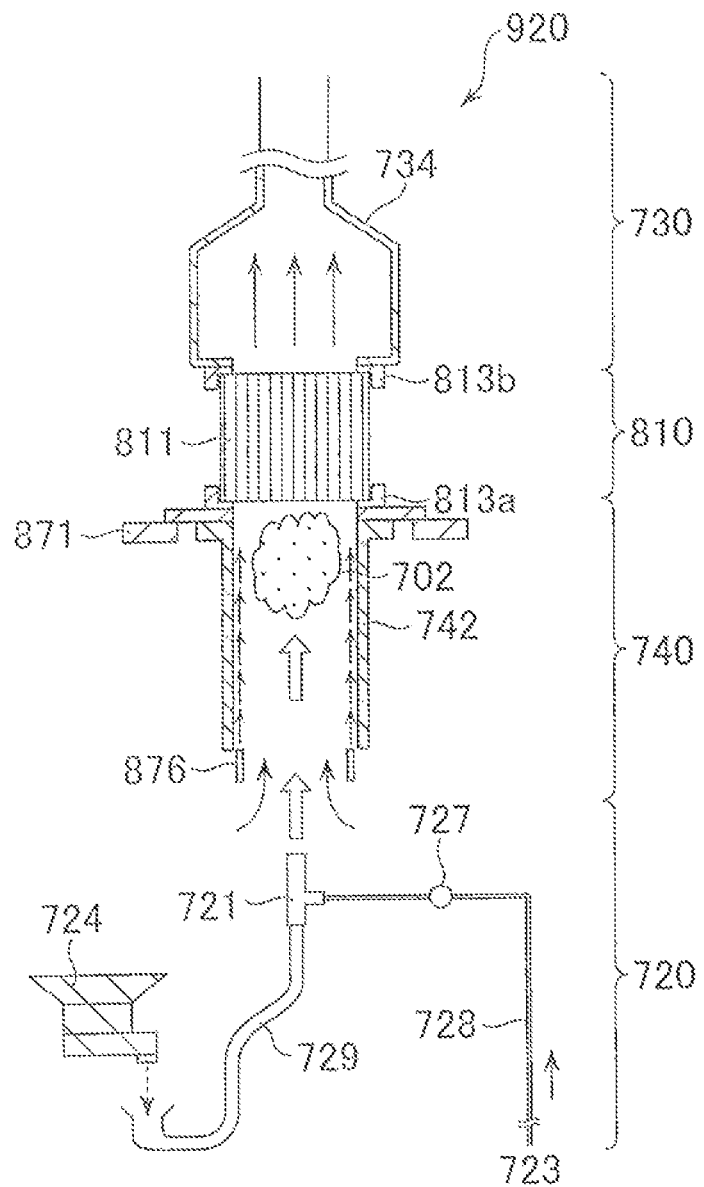
FIG. 7C is a schematic view showing a honeycomb filter production apparatus according to still another embodiment of the invention.

A honeycomb filter production apparatus 920 shown in FIG. 7C includes the workpiece securing section 810, the powder transfer section 720, the suction section 730, and the introduction section 740 in the same manner as the honeycomb filter production apparatus 800 shown in FIGS. 6A and 6B, but differs from the honeycomb filter production apparatus 800 in that the introduction section 740 includes a discharge nozzle 876 that discharges gas (e.g., air) to an area around the inner circumferential surface of the guide member 742. The honeycomb filter production apparatus 920 is configured in the same manner as the honeycomb filter production apparatus 800 except for the above feature (description of identical features is omitted).

Figure 8:
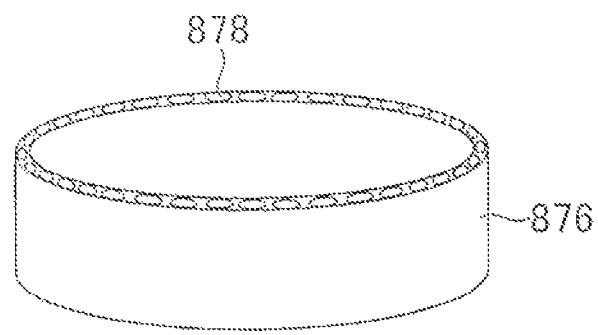
FIG. 8 is a perspective view showing a discharge nozzle used for the honeycomb filter production apparatus shown in FIGS. 7C and 7D.

As shown in FIG. 8, the discharge nozzle 876 of the honeycomb filter production apparatus 920 is configured so that a plurality of nozzle holes 878 are circularly formed. As shown in FIG. 7C, the discharge nozzle 876 is disposed at the lower open end of the guide member 742 (i.e., the end of the guide member 742 opposite to the workpiece securing section 810) so that the axis of the nozzle hole 878 is parallel to the inner circumferential surface of the guide member 742.

When coating the powder for forming the collection layer on the inner surface of the cells (i.e., the surface of the partition wall) of the workpiece 811 using the honeycomb filter production apparatus 920, gas is supplied to the discharge nozzle 876 from the outside. The gas supplied to the discharge nozzle 876 is discharged from the circularly-formed nozzle holes 878 to an area around the inner circumferential surface of the guide member 742, and moves upward along (parallel to) the inner circumferential surface of the guide member 742 due to the discharge force and suction by the suction section 730. A situation in which the powder for forming the collection layer (i.e., the powder contained in the aerosol ejected from the ejector 721) adheres to the inner circumferential surface of the guide member 742 is prevented by the upward flow.

A variation in the amount of powder coated on each workpiece can be suppressed while improving the yield with respect to the raw material by thus preventing a situation in which the powder for forming the collection layer adheres to the inner circumferential surface of the guide member 742. Note that the gas discharged from the discharge nozzle 876 is mixed with the aerosol ejected from the ejector 721 to produce the aerosol 702, which is introduced into the workpiece 811.

Figure 7D:
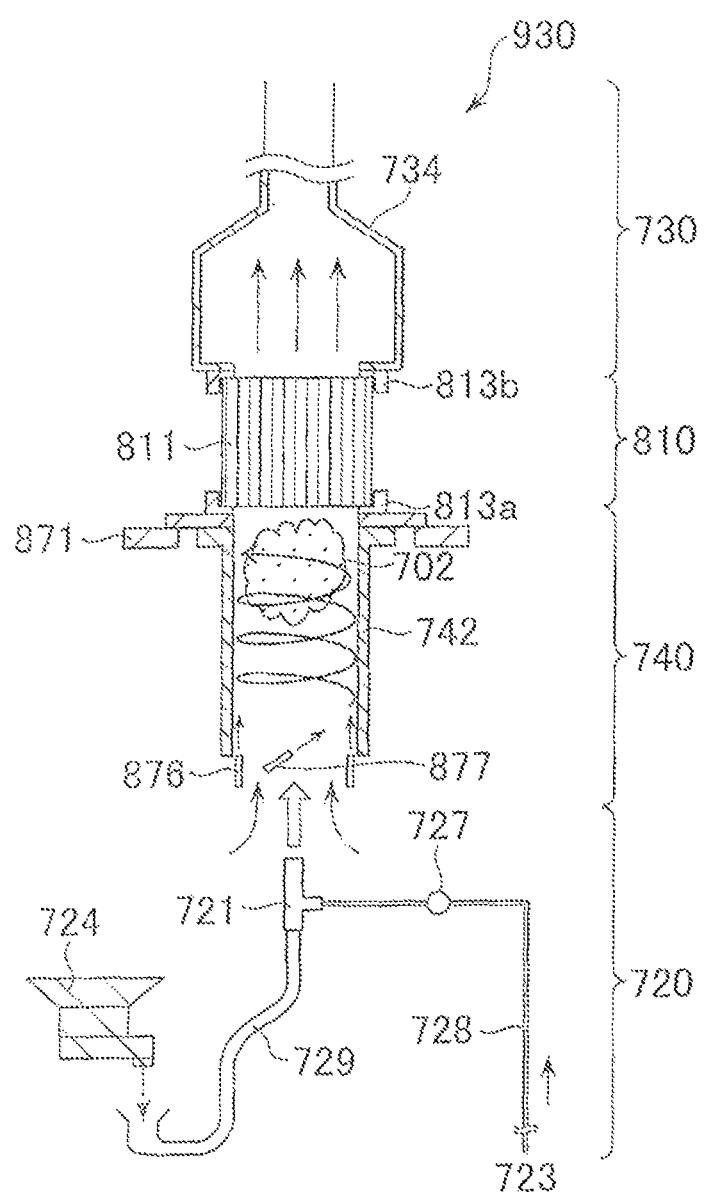
FIG. 7D is a schematic view showing a honeycomb filter production apparatus according to still another embodiment of the invention.

The honeycomb filter production apparatus 930 shown in FIG. 7D differs from the honeycomb filter production apparatus 920 shown in FIG. 7C in that a discharge nozzle 877 is provided in addition to the discharge nozzle 876. The honeycomb filter production apparatus 930 is configured in the same manner as the honeycomb filter production apparatus 920 except for the above feature (description of identical features is omitted).

The discharge nozzle 877 of the honeycomb filter production apparatus 930 is disposed at the lower open end of the guide member 742 (i.e., the end of the guide member 742 opposite to the workpiece securing section 810) so that the axis of a nozzle hole of the nozzle hole 877 is inclined with respect to the inner circumferential surface of the guide member 742.

When coating the powder for forming the collection layer on the inner surface of the cells (i.e., the surface of the partition wall) of the workpiece 811 using the honeycomb filter production apparatus 930, gas is supplied to the discharge nozzles 876 and 877 from the outside. The gas discharged from the discharge nozzle 876 in parallel to the inner circumferential surface of the guide member 742 is mixed with the gas discharged from the discharge nozzle 877 at an angle with respect to the inner circumferential surface of the guide member 742. The mixed gas whirls upward along the inner circumferential surface of the guide member 742 due to suction by the suction section 730. A situation in which the powder for forming the collection layer (i.e., the powder contained in the aerosol ejected from the ejector 721) adheres to the inner circumferential surface of the guide member 942 (inner tube section 942*b*) is prevented by the swirl flow.

A variation in the amount of powder coated on each workpiece can be suppressed while improving the yield with respect to the raw material by thus preventing a situation in which the powder for forming the collection layer adheres to the inner circumferential surface of the guide member 742. Note that the gas discharged from the discharge nozzles 876 and 877 is mixed with the aerosol ejected from the ejector 721 to produce the aerosol 702, which is introduced into the workpiece 811.

The configuration and the materials of each honeycomb filter production apparatus of the present invention have been described above. Note that each honeycomb filter production apparatus may be produced by utilizing commercially available instruments and parts, processing commercially available materials, and appropriately combining these instruments, parts, and materials.

A method of producing a honeycomb filter according to one embodiment of the invention is described below. The method of producing a honeycomb filter according to one embodiment of the invention includes producing a honeycomb filter using the honeycomb filter production apparatus according to one embodiment of the invention, the honeycomb filter including a base that is formed of a porous body having an approximately pillar-like external shape, the base including a plurality of cells that extend from one end face to the other end face of the base, and a collection layer being formed on the inner surface of the base.

Specifically, a forming raw material that includes a ceramic raw material is extruded to obtain a formed product that has an approximately pillar-like external shape, and includes a plurality of cells that serve as fluid passages and extend from one end face to the other end face of the formed product. More specifically, aggregate particles preferably formed of cordierite, silicon carbide, alumina, mullite, aluminum titanate, or silicon nitride, water, an organic binder (e.g., hydroxypropoxylmethyl cellulose or methyl cellulose), a pore-forming material (e.g., graphite, starch, or synthetic resin), a surfactant (e.g., ethylene glycol or fatty acid soap), and the like are mixed, and kneaded using a kneader, a vacuum deairing machine, or the like to prepare a clay. The clay is extruded to the desired shape using an extruder provided with a die having the desired cell shape, partition wall thickness, and cell density. The extruded product is dried using a microwave dryer and a hot-blast dryer to obtain a formed product.

Adjacent cells of the formed product are alternately plugged at one open end and the other open end so that each end face (i.e., one end face and the other end face) of the formed product has a checkered pattern (staggered pattern). The formed product is then fired to obtain a base. More specifically, a plugging slurry preferably of the same material as the aggregate particles are stored in a container. About half of the cells are masked on one end face of the formed product so that a checkered pattern (staggered pattern) is formed. The end face of the formed product thus masked is immersed in the plugging slurry in the container so that the opening of each unmasked cell is filled (plugged) with the plugging slurry. The cells that are plugged on one end face of the formed product are masked (in a checkered pattern (staggered pattern)) on the other end face of the formed product, and the end face of the formed product thus masked is immersed in the plugging slurry in the container so that the opening of each unmasked cell is filled (plugged) with the plugging slurry. Therefore, the cells that are not plugged on one end face of the formed product are plugged on the other end face of the formed product, and the cells that are not plugged on the other end face of the formed product are plugged on the one end face of the formed product, to obtain a structure in which the cells are alternately plugged in a checkered pattern (staggered pattern) on each end face. The plugged formed product is then calcined, cleaned, and fired to obtain a base. The combustion temperature of the organic binder is normally about 100 to 300° C., and the combustion temperature of the pore-forming material is normally about 200 to 800° C. Therefore, the calcining temperature may be set to about 200 to 1000° C. The firing temperature may be appropriately selected depending on the type of aggregate particle raw material. The firing temperature is normally about 1400 to 1500° C.

The resulting base is then weighed using a scale preferably having a resolution of 10 mg or less (measurement step before coat). Aerosol is then introduced into the cells of the base using the honeycomb filter production apparatus according to one embodiment of the invention so that a powder contained in the aerosol is coated on the inner surface of the cells of the base (coat step). The average particle size of the powder (particles) is selected depending on the average pore size of the partition wall, but is preferably 1 to 15 μm. Silicon carbide, silicon nitride, cordierite, alumina, zirconia, titania, silica, aluminum titanate, or the like is preferably used as the material for the powder. The powder is particularly preferably formed of the same material as that of the aggregate particles (base).

The powder may be obtained by subjecting the material to size classification, and grinding the large particles using a jet mill (dry) or a pot mill (wet) to obtain ground particles having a sharp particle size distribution. Note that a powder having a particle size smaller than the average pore size of the partition wall of the base is coated on the surface (surface layer (i.e., the range of 20% from the surface of the partition wall in the thickness direction of the partition wall)) of the partition wall. It is conjectured that the powder (particles) having a particle size smaller than the average pore size of the partition wall does not move along the streamline of an air current when the aerosol including the powder passes through the partition wall due to a particle collection mechanism (e.g., diffusion and interception), and is coated on the surface (surface layer) of the partition wall.

When coating the powder on the partition wall of the base using the honeycomb filter production apparatus according to one embodiment of the invention, the base (workpiece) is secured on the workpiece securing section, the amount of powder supplied from the powder transfer section and the flow rate of an air current (air) supplied from the pressurized gas supply device are set to given values, and the suction flow rate of the suction section is also set to a given value. It is important to set the suction flow rate of the suction section so that the flow rate inside the ejector is higher than the flow rate inside the base (partition wall) in order to reliably coat the powder on the inner surface of the cells (i.e., the surface of the partition wall) to a uniform thickness.

After coating the powder on the partition wall of the base, the powder remaining on the (inlet side) end face of the base through which the aerosol has been introduced is removed using an air-nozzle or the like (cleaning step). The base on which the powder is coated is then weighed using a scale preferably having a resolution of 10 mg or less (measurement step after coat) to confirm whether or not the powder has been successfully coated.

The base is then fired so that the powder coated on the inner surface of the cells is sintered and stabilized to obtain a honeycomb filter. In this case, the firing temperature is preferably set to be lower than the firing temperature employed when producing the base. It suffices that the base be heated to a temperature at which the powder is sintered and immobilized. The firing temperature is selected depending on the material for the powder, but is preferably 1250 to 1350° C.

EXAMPLES

The invention is further described below by way of examples. Note that the invention is not limited to the following examples.

Example 1

A plugged honeycomb structure having a quadrangular prism shape was produced using silicon carbide as aggregate particles. A powder was coated on the inner surface of the cells of the plugged honeycomb structure (base) using the honeycomb filter production apparatus 110 shown in FIG. 1B. The distance between the end face of the plugged honeycomb structure and the ejection end of the ejector 21 when securing the plugged honeycomb structure on the workpiece securing section 10 was 290 mm. The length of the guide member 42 was 300 mm, and the internal dimensions of the guide member 42 were 50×50 mm. The plugged honeycomb structure having a quadrangular prism shape had an axial length of 152.4 mm. The size of the cross section of the plugged honeycomb structure perpendicular to its axis was 36.2×36.2 mm. The plugged honeycomb structure had a cell density of 300 cpsi (cells/in$^2$), and a partition wall thickness of 12 mils (1 mil=about 0.0254 mm). The flow rate of gas sucked by the suction section 30 was 0.4 m$^3$/min, the flow rate of gas ejected from the powder transfer section 20 was 0.1 m$^3$/min, and the flow rate of gas mixed in the introduction section 40 was 0.3 m$^3$/min. The amount of powder supplied was 1.2 g. The feed time was 3 seconds, and the feed rate was 24 g/min. The yield determined from the ratio of the amount of powder coated on the plugged honeycomb structure to the amount of powder supplied to the plugged honeycomb structure was 89%. Note that the amount (g) of powder coated on the plugged honeycomb structure was determined from the difference between the weight of the plugged honeycomb structure measured in the measurement step before coat and the weight of the plugged honeycomb structure measured in the measurement step after coat, and the amount (g) of powder supplied to the plugged honeycomb structure was determined from the amount of powder supplied from the powder feeding device.

Example 2

A columnar plugged honeycomb structure was produced using cordierite (cordierite-forming material) as aggregate particles. A powder was coated on the inner surface of the cells of the plugged honeycomb structure (base) using the honeycomb filter production apparatus 300 shown in FIG. 2. The distance between the end face of the plugged honeycomb structure and the ejection end of the ejector 321 when securing the plugged honeycomb structure on the workpiece securing section 310 was 800 mm. The length of the guide member 342 was 750 mm, and the inner diameter of the guide member 342 was 240 mm. The columnar plugged honeycomb structure had an axial length of 152.4 mm. The diameter of the cross section of the plugged honeycomb structure perpendicular to its axis was 144 mm. The plugged honeycomb structure had a cell density of 300 cpsi (cells/m$^2$), and a partition wall thickness of 12 mils (1 mil=about 0.0254 mm). The flow rate of gas sucked by the suction section 330 was 2.8 m$^3$/min, the flow rate of gas ejected from the powder transfer section 320 was 0.1 m$^3$/min, and the flow rate of gas mixed in the introduction section 40 was 2.7 m$^3$/min. The amount of powder supplied was 28 g. The feed time was 56 seconds, and the feed rate was 30 g/min. The yield determined from the ratio of the amount of powder coated on the plugged honeycomb structure to the amount of powder supplied to the plugged honeycomb structure in the same manner as in Example 1 was 73%. Note that the amount of powder coated on the plugged honeycomb structure was 20.4 g.

Example 3

Five columnar plugged honeycomb structures were produced using cordierite (cordierite-forming material) as aggregate particles. A powder was coated on the inner surface of the cells of each plugged honeycomb structure (base) using the honeycomb filter production apparatus 910 shown in FIG. 7B. The distance between the end face of the plugged honeycomb structure and the ejection end of the ejector 721 when securing the plugged honeycomb structure on the workpiece securing section 810 was 800 mm. The length of the guide member 942 was 750 mm, the inner diameter of the outer tube section 942*a* was 240 mm, and the inner diameter of the inner tube section 942*b* was 210 mm. The columnar plugged honeycomb structure had an axial length of 152.4 mm. The diameter of the cross section of the plugged honeycomb structure perpendicular to its axis was 144 mm. The plugged honeycomb structure had a cell density of 300 cpsi (cells/in$^2$), and a partition wall thickness of 12 mils (1 mil=about 0.0254 mm). The flow rate of gas sucked by the suction section 730 was 2.8 m$^3$/min, the flow rate of gas ejected from the powder transfer section 720 was 0.1 m$^3$/min, and the flow rate of gas mixed in the introduction section 740 was 2.7 m$^3$/min. The amount of powder supplied was 30 g. The feed time was 60 seconds, and the feed rate was 30 g/min. Air was supplied to the space 873 from the outside of the guide member 942 via the pipe 828 using the pump 874. Note that air was supplied so that the flow rate of air discharged to the inside of the guide member 942 from the holes 875 in the inner tube section 942*b* was 5 m/sec. The yield determined from the ratio of the amount of powder coated on the plugged honeycomb structure to the amount of powder supplied to the plugged honeycomb structure in the same manner as in Example 1 was 90 to 95%. Note that the amount of powder coated on each plugged honeycomb structure was 27 to 28.5 g (variation=±10%).

Example 4

Ten columnar plugged honeycomb structures were produced using cordierite (cordierite-forming material) as aggregate particles. A powder was coated on the inner surface of the cells of each plugged honeycomb structure (base) using the honeycomb filter production apparatus 930 shown in FIG. 7D. The distance between the end face of the plugged honeycomb structure and the ejection end of the ejector 721 when securing the plugged honeycomb structure on the workpiece securing section 810 was 800 mm. The length of the guide member 742 was 750 mm, and the inner diameter of the guide member 742 was 240 mm. The columnar plugged honeycomb structure had an axial length of 152.4 mm. The diameter of the cross section of the plugged honeycomb structure perpendicular to its axis was 144 mm. The plugged honeycomb structure had a cell density of 300 cpsi (cells/m$^2$), and a partition wall thickness of 12 mils (1 mil=about 0.0254 mm). The flow rate of gas sucked by the suction section 730 was 2.8 m$^3$/min, the flow rate of gas ejected from the powder transfer section 720 was 0.1 m$^3$/min, and the flow rate of gas mixed in the introduction section 740 was 2.7 m$^3$/min. The amount of powder supplied was 30 g. The feed time was 60 seconds, and the feed rate was 30 g/min. Air was supplied to the discharge nozzles 876 and 877 from the outside. Air discharged from the discharge nozzles 876 and 877 whirled upward along the inner circumferential surface of the guide member 742. The yield determined from the ratio of the amount of powder coated on the plugged honeycomb structure to the amount of powder supplied to the plugged honeycomb structure in the same manner as in Example 1 was 80%. Note that the amount of powder coated on each plugged honeycomb structure was 24.0 to 25.3 g (variation=±10%).

Example 5

The plugged honeycomb structures obtained in Examples 1 to 4 were fired to obtain plugged honeycomb structures in which a collection layer was formed. The pressure loss of each plugged honeycomb structure was measured in a state in which PM was coated. The pressure loss decreased as compared with the case where the collection layer was not formed. This confirms that the collection layer had an effect of decreasing the pressure loss. Samples having an identical size were cut from an area around the center (i.e., an area including the center axis) and an area around the outer circumferential surface of each plugged honeycomb structure. No significant difference in pressure loss between the samples was observed. Each collection layer (i.e., the inner surface of the cells) was observed using a scanning electron microscope. No difference in appearance was observed between each collection layer, and an area in which the powder was not coated was not observed. It was thus confirmed that a uniform collection layer was formed.

The above honeycomb filter production apparatus may suitably be used as a means that produces a honeycomb filter used as a DPF. A DPF is a filter that is used to collect particulate matter contained in exhaust gas discharged from an internal combustion engine (e.g., diesel engine) or a combustion apparatus to purify the exhaust gas.

What is claimed is:

1. A honeycomb filter production apparatus used for producing a honeycomb filter, the apparatus comprising:
    a workpiece securing section for securing a base of a honeycomb filter;
    a powder transfer section disposed on one side of the workpiece securing section, and transfers a powder together with an air current by utilizing pressurized gas, wherein the powder transfer section includes an ejector as a powder-dispersing means;
    an introduction section provided between the powder transfer section and the workpiece securing section, wherein the powder transferred from the powder transfer section together with the air current is mixed with air in the introduction section, wherein the introduction section has a speed adjusting means for adjusting the speed by swirling the powder transferred by the air current from the powder transfer section and introduced into the base of the honeycomb filter secured by the workpiece securing section when the apparatus is used, wherein the introduction section has an open space formed between the powder transfer section and the workpiece securing section, such that a flow rate of the air current that flows through the powder transfer section and a flow rate of the powder with air current passed into cells of the honeycomb filter are independently controlled;
    a suction section disposed on the other side of the workpiece securing section, for sucking the gas that has passed through the base secured by the workpiece securing section by reducing pressure on the other side of the workpiece securing section as compared with the one side of the workpiece securing section using suction means.

2. The honeycomb filter production apparatus according to claim 1, wherein the ejector sucks the powder by utilizing an air current, and discharges the powder together with pressurized gas so that the powder is dispersed in the gas.

3. The honeycomb filter production apparatus according to claim 2, wherein a powder suction direction and a powder discharge direction of the ejector are approximately parallel.

4. The honeycomb filter production apparatus according to claim 1, wherein the powder transfer section includes powder-feeding means that supplies a given amount of powder.

5. The honeycomb filter production apparatus according to claim 1, wherein the introduction section includes a guide member that guides the powder to the base secured by the workpiece securing section.

6. The honeycomb filter production apparatus according to claim 5, wherein the guide member is a tubular porous body.

7. The honeycomb filter production apparatus according to claim 5, wherein the guide member includes an outer tube section, and an inner tube section that has a number of holes and is disposed inside the outer tube section at a given interval from the outer tube section, and the introduction section includes gas supply means that supplies gas to a space between the outer tube section and the inner tube section.

8. The honeycomb filter production apparatus according to claim 5, wherein the guide member is tubular, and the introduction section includes a discharge nozzle that discharges gas to an area around an inner circumferential surface of the guide member.

9. The honeycomb filter production apparatus according to claim 1, wherein the base of the honeycomb filter has a pillar shape, an axial direction of the base secured by the workpiece securing section is approximately vertical during use, and the air current flows upward.

10. The honeycomb filter production apparatus according to claim 1, wherein the powder transfer section or the introduction section includes classification means.

11. A method of producing a honeycomb filter comprising coating the powder on an inner surface of the base of the honeycomb filter using the honeycomb filter production apparatus according to claim 1 while adjusting a flow rate A of a gas a that is sucked by the suction section, a flow rate B of a gas b ejected from the powder transfer section, and a flow rate C of a gas c that is mixed with the gas b in the introduction section so that the relationships "A=B+C" and "C>0" are satisfied.

* * * * *